US010838609B2

(12) United States Patent
Zhang et al.

(10) Patent No.: US 10,838,609 B2
(45) Date of Patent: *Nov. 17, 2020

(54) SYSTEMS AND METHODS FOR DYNAMICALLY APPENDING SUPPLEMENTAL CONTENT TO AN INFORMATION RESOURCE RESPONSIVE TO SCROLL ACTIVITY

(71) Applicant: Google LLC, Mountain View, CA (US)

(72) Inventors: Kun Zhang, Pleasanton, CA (US); Willa Angel Chen, San Jose, CA (US); Yingwei Cui, Palo Alto, CA (US); William Martin Halpin, Jr., Palo Alto, CA (US); Bahman Rabii, San Francisco, CA (US); Tobias Maurer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,344

(22) Filed: Apr. 9, 2019

(65) Prior Publication Data

US 2019/0235720 A1 Aug. 1, 2019

Related U.S. Application Data

(63) Continuation of application No. 15/018,667, filed on Feb. 8, 2016, now Pat. No. 10,289,296.

(Continued)

(51) Int. Cl.
*G06F 3/0485* (2013.01)
*G06F 16/957* (2019.01)
*G06F 40/14* (2020.01)

(52) U.S. Cl.
CPC ........ *G06F 3/0485* (2013.01); *G06F 16/9574* (2019.01); *G06F 40/14* (2020.01)

(58) Field of Classification Search
CPC combination set(s) only.
See application file for complete search history.

(56) References Cited

U.S. PATENT DOCUMENTS 6,912,694 B1 6/2005 Harrison et al.
7,428,709 B2 9/2008 Forstall et al.
(Continued)

FOREIGN PATENT DOCUMENTS

JP  2009-527052 A  7/2009
WO  WO-2004/031994 A1  4/2004
(Continued)

OTHER PUBLICATIONS

Final Office Action on U.S. Appl. No. 15/014,795 dated Jan. 2, 2019 (12 pages).
(Continued)

*Primary Examiner* — Hien L Duong
(74) *Attorney, Agent, or Firm* — Foley & Lardner LLP

(57) ABSTRACT

Method and systems for displaying content items on an information resource include identifying a supplemental content item to append to a DOM tree of the information resource and identifying a first content item displayed in a first container of the information resource. The methods also includes monitoring a position of a predetermined portion of the first content item relative to a viewport of the application and determining, responsive to monitoring the position of the predetermined portion of the first content item, that the first content item is visible within the viewport of the application. The method also includes appending the supplemental content item in a second container at a first position between the first container and an end of the information resource and displaying the supplemental content item
(Continued)

within the viewport of the application responsive to detecting a scroll action towards the end of the information resource.

20 Claims, 7 Drawing Sheets

Related U.S. Application Data

(60) Provisional application No. 62/208,180, filed on Aug. 21, 2015.

(56) References Cited

U.S. PATENT DOCUMENTS

| | | | |
|---|---|---|---|
| 7,756,880 | B2 | 7/2010 | Sighart et al. |
| 8,307,278 | B1 | 11/2012 | Spear |
| 8,423,901 | B2 | 4/2013 | D'Entremont et al. |
| 8,589,367 | B2 | 11/2013 | Sighart et al. |
| 9,575,615 | B1 | 2/2017 | Nicholls et al. |
| 9,852,759 | B2 * | 12/2017 | Doherty ............... G06F 3/0485 |
| 9,865,005 | B1 | 1/2018 | Pottjegort |
| 2005/0160360 | A1 | 7/2005 | Nadamoto et al. |
| 2006/0174214 | A1 | 8/2006 | McKee et al. |
| 2006/0212803 | A1 | 9/2006 | Arokiaswamy |
| 2007/0198476 | A1 | 8/2007 | Farago et al. |
| 2009/0240683 | A1 | 9/2009 | Lazier et al. |
| 2009/0327869 | A1 | 12/2009 | Fan et al. |
| 2009/0327952 | A1 | 12/2009 | Karas et al. |
| 2010/0017289 | A1 | 1/2010 | Sah et al. |
| 2010/0179949 | A1 | 7/2010 | Safar |
| 2010/0235765 | A1 | 9/2010 | Worthington |
| 2011/0082755 | A1 | 4/2011 | Itzhak |
| 2011/0184960 | A1 | 7/2011 | Delpha et al. |
| 2011/0191716 | A1 | 8/2011 | Sakamoto et al. |
| 2012/0054596 | A1 * | 3/2012 | Kroger ................. G06F 40/174 715/234 |
| 2012/0254729 | A1 | 10/2012 | Wan |
| 2013/0027408 | A1 | 1/2013 | Garg |
| 2013/0054371 | A1 | 2/2013 | Mason et al. |
| 2013/0305170 | A1 | 11/2013 | De Souza et al. |
| 2014/0006982 | A1 | 1/2014 | Wabyick et al. |
| 2014/0136528 | A1 | 5/2014 | Anima et al. |
| 2014/0195337 | A1 | 7/2014 | Taylor et al. |
| 2014/0195890 | A1 | 7/2014 | Taylor et al. |
| 2014/0281901 | A1 | 9/2014 | Mostowy et al. |
| 2014/0281924 | A1 | 9/2014 | Chipman et al. |
| 2014/0358668 | A1 | 12/2014 | Fredinburg et al. |
| 2015/0007108 | A1 | 1/2015 | Ozcelik |
| 2015/0154660 | A1 | 6/2015 | Weald et al. |
| 2015/0160817 | A1 | 6/2015 | Hwang et al. |
| 2015/0213487 | A1 | 7/2015 | Nwosu |
| 2016/0004781 | A1 | 1/2016 | Sturm et al. |
| 2016/0019604 | A1 | 1/2016 | Kobayashi et al. |
| 2016/0034976 | A1 | 2/2016 | Dayanand et al. |
| 2017/0024098 | A1 * | 1/2017 | Doherty ........... H04N 21/47217 |
| 2018/0130097 | A1 * | 5/2018 | Tran .................. G06Q 30/0267 |
| 2018/0197575 | A1 * | 7/2018 | Doherty ............. G11B 27/3081 |

FOREIGN PATENT DOCUMENTS

| | | |
|---|---|---|
| WO | WO-2011/084860 A2 | 7/2011 |
| WO | WO-2013/033445 A2 | 3/2013 |

OTHER PUBLICATIONS

HTML Code Tutorial. IFRAME. Dated Dec. 5, 2015 (2 pages).
International Preliminary Report on Patentability for Appln. Ser. No. PCT/US2016/047887 dated Jan. 12, 2018 (28 pages).
International Preliminary Report on Patentability for PCT Appln. Ser. No. PCT/US2016/058833 dated Mar. 1, 2018 (26 pages).
International Search Report and Written Opinion for Appln. Ser. No. PCT/US2016/047887 dated Nov. 8, 2016 (12 pages).
International Search Report and Written Opinion for Appln. Ser. No. PCT/US2016/058833 dated Feb. 16, 2017 (14 pages).
Naver, "A Reply to iframe from Naver," dated May 30, 2009, Internet URL: https://kin.naver.com/qna/detail.nhn?d1id=1&dirId=105&docId=69486524&qb=7J2465287J24IO2UhOugiOyehCDsiqTtgazroaQ=&enc=utf8?ion=kin&rank=3&search_sort=0&spq=0&pid=U5eYG1pySDVsstYnu2VssssssZ281040&sid=DtFAQnAeOLxTcq5oRhe0Mg%3D%3D (3 pages).
Non-Final Office Action on U.S. Appl. No. 15/014,795 dated Jun. 15, 2018 (11 pages).
Notice of Allowance for JP Appln. Ser. No. 2017-567733 dated Aug. 14, 2019 (6 pages).
Notice of Allowance on U.S. Appl. No. 15/014,795 dated Sep. 9, 2019 (5 pages).
Notice of Allowance on U.S. Appl. No. 15/018,667 dated Apr. 2, 2019 (2 pages).
Notice of Allowance on U.S. Appl. No. 15/018,667 dated Jan. 3, 2019 (9 pages).
Notice of Reasons for Rejections for JP Appln. Ser. No. 2017-567733 dated Feb. 25, 2019 (6 pages).
Office Action for KR Appln. Ser. No. 10-20177035508 dated Mar. 29, 2019 (15 pages).
R. Baxter: "Infinite Scroll, pushState and SEO," Oct. 7, 2014, XP055312334, retrieved from the Internet: URL: https://builtvisible.com/on-infinite-scroll-pushstate/ [retrieved on Oct. 19, 2016] (16 pages).
Svensson, "HTML5 and Seamless Iframes with JavaScript", christersvensson.com web site, Jan. 1, 2012 (Jan. 1, 2012), pp. 1-3, XP055341156, Retrieved from the Internet: URL: http://www.christersvensson.com/html-tool/iframe.htm [retrieved on Feb. 1, 2017] (3 pages).
U.S. Office Action for U.S. Appl. No. 15/018,667 dated Apr. 30, 2018 (14 pages).
Zimmerman, "Strategies for the iFrame on the iPad Problem", Magnolia Blogs, May 18, 2012, pp. 1-7, XP055342211 (8 pages).
Notice of Allowance for U.S. Appl. No. 15/014,795 dated Jan. 15, 2020 (5 pages).
"infinity.js", Airbnb, Inc., 2012, retrieved Oct. 19, 2016 from URL: http://airbnb.io/infinity/docs/infinity.html (8 pages).
Office Action on EP Appln. Ser. No. 16795189.6 dated Nov. 12, 2019 (8 pages).
Examination Report for EP Appln. Ser. No. 16760267.1 dated Apr. 30, 2020 (6 pages).

* cited by examiner

SYSTEMS AND METHODS FOR DYNAMICALLY APPENDING SUPPLEMENTAL CONTENT TO AN INFORMATION RESOURCE RESPONSIVE TO SCROLL ACTIVITY

RELATED APPLICATION

The present application is a continuation of and claims priority to U.S. patent application Ser. No. 15/018,667, entitled "SYSTEMS AND METHODS FOR DYNAMICALLY APPENDING SUPPLEMENTAL CONTENT TO AN INFORMATION RESOURCE RESPONSIVE TO SCROLL ACTIVITY," filed Feb. 8, 2016, which claims priority to and the benefit of, under 35 U.S.C. § 119, U.S. Provisional Patent Application No. 62/208,180, entitled "SYSTEMS AND METHODS FOR DYNAMICALLY APPENDING SUPPLEMENTAL CONTENT TO AN INFORMATION RESOURCE RESPONSIVE TO SCROLL ACTIVITY," filed Aug. 21, 2015, the disclosures of each of which is incorporated herein by reference in their entirety.

BACKGROUND

In a computer networked environment such as the internet, content publishers provide content items for display on end-user computing devices. A content item provided by a publisher can be displayed on web page associated with that publisher.

SUMMARY

At least one aspect is directed to a system for displaying content items on an information resource of a content publisher. The system includes at least one processor and a memory. The memory can store computer executable instructions and a supplemental content scroll script. The computer executable instructions when executed on the one or more processors cause the system to identify a supplemental content item to append to a Document Object Model (DOM) tree of the information resource and identify a first content item displayed within a first container of the information resource. The system can monitor a position of a predetermined portion of the first content item relative to a viewport of an application and determine, responsive to monitoring the position of the predetermined portion of the first content item, that the predetermined portion of the first content item is visible within the viewport of the application. The system can append the supplemental content item in a second container at a first position between the first container and an end of the information resource and, responsive to detecting a scroll action towards the end of the information resource, display the supplemental content item within the viewport of the application.

In some implementations, the supplemental content scroll script can be configured to cause the system to select the supplemental content item from a plurality of supplemental content items existing in other information resources of the content publisher. In some implementations, the supplemental content scroll script can be configured to cause the system to generate the second container to insert to the end of the information resource, insert the supplemental content item within the second container, and modify one or more setting parameters of the second container to match one or more setting parameters of the first container that includes the first content item.

In some implementations, the supplemental content scroll script can be configured to cause the system to select the supplemental content item from a plurality of supplemental content items existing in other information resources of the content publisher. In some implementations, the supplemental content scroll script can be configured to cause the system to generate the second container to insert to the end of the information resource, insert the supplemental content item within the second container, and modify one or more setting parameters of the second container to match one or more setting parameters of the first container that includes the first content item.

In some implementations, the supplemental content scroll script can cause the system to identify that the supplemental content item is displayed within the viewport of the application, modify, responsive to identifying that the supplemental content item is displayed within the viewport of the application, a universal resource locator (URL) included in an address bar of the application from a first URL of the information resource including the first content item to a second URL of another information resource corresponding to the supplemental content.

In some implementations, monitoring a position of the predetermined portion of the first content item relative to a viewport of the application can include determining a first coordinate value of the predetermined portion of the first content item along a first axis, determining a second coordinate value of a first portion of the information resource corresponding to one edge of the viewport, and determining a third coordinate value of a second portion of the information resource that corresponds to a second edge of the viewport along the first axis. Determining that the first content item is visible within the viewport of the application can include determining that the first coordinate value lies between the second coordinate value and the third coordinate value.

In some implementations, the supplemental content scroll script can cause the system to receive a candidate supplemental content recommendation. The candidate supplemental content recommendation can include a URL of an information resource in which a candidate supplemental content item is stored. The supplemental content scroll script can cause the system to update a virtual queue to include the received candidate supplemental content recommendation.

In some implementations identifying a supplemental content item can include identifying a plurality of supplemental content items. The supplemental content scroll script can cause the system to generate a plurality of selectable content objects. Each of the plurality of selectable content objects corresponds to a respective candidate supplemental content item and including a respective actionable item. The supplemental content scroll script can cause the system to display a supplemental content item corresponding to that actionable item, responsive to detecting a selection of one of the plurality of actionable items corresponding to the plurality of supplemental content items.

In some implementations, the supplemental content scroll script can cause the system to identify that the supplemental content item is displayed within the viewport of the application and append, responsive to identifying that the first supplemental content item is displayed within the viewport of the application, a second supplemental content item in a third container at a second position between the second container and the end of the information resource.

At least one aspect is directed to a system for displaying content items on an information resource. The system includes at least one processor and a memory. The memory can store computer executable instructions and a supplemental content scroll script. The computer executable instructions when executed on the one or more processors can cause the system to receive, from an application of a computing device, a request for a third-party content item to insert within an information resource of a content publisher. The computer executable instructions when executed on the one or more processors also can cause the system to transmit, responsive to the request, the supplemental content scroll script to the computing device to display supplemental content responsive to scroll activity performed on the application. The supplemental content scroll script includes a supplemental content identification module, viewport monitoring module and supplemental content appending module. The supplemental content identification module, the viewport monitoring module and the supplemental content appending module, when executed on the computing device, cause the computing device to identify a supplemental content item to append to a DOM tree of the information resource, identify a first content item displayed in a first container of the information resource, and monitor a position of a predetermined portion of the first content item relative to a viewport of the application. The supplemental content identification module, the viewport monitoring module and the supplemental content appending module, when executed on the computing device, can cause the computing device to determine, responsive to monitoring the position of the predetermined portion of the first content item, that the predetermined portion of the first content item is visible within the viewport of the application, append the supplemental content item in a second container at a first position between the first content item and an end of the information resource, and display the supplemental content item within the viewport of the application responsive to detecting a scroll action towards the end of the information resource.

In some implementations, the supplemental content identification module, when executed on the computing device, can cause the computing device to select the supplemental content item from a plurality of supplemental content items existing in second information resources of the content publisher. In some implementations, the supplemental content appending module, when executed on the computing device, can cause the computing device to generate the second container to insert to the end of the information resource and insert the supplemental content item within the second container. The supplemental content appending module, when executed on the computing device, can also cause the computing device to modify one or more setting parameters of the second container to match one or more setting parameters of the first container that includes the first content item.

In some implementations, the viewport monitoring module, when executed on the computing device, can cause the computing device to identify that the supplemental content item is displayed within the viewport of the application. The viewport monitoring module, when executed on the computing device, can cause the computing device to modify, responsive to identifying that the supplemental content item is displayed within the viewport of the application, a universal resource locator (URL) included in an address bar of the application from a first URL of the information resource including the first content item to a second URL of another information resource corresponding to the supplemental content.

In some implementations, monitoring a position of the predetermined portion of the first content item relative to a viewport of the application can include determining a first coordinate value of the predetermined portion of the first content item along a first axis, determining a second coordinate value of a first portion of the information resource corresponding to one edge of the viewport, and determining a third coordinate value of a second portion of the information resource that corresponds to a second edge of the viewport along the first axis. Determining that the first content item is visible within the viewport of the application ca include determining that the first coordinate value lies between the second coordinate value and the third coordinate value.

In some implementations, the supplemental content identification module, when executed on the computing device, can cause the computing device to receive a candidate supplemental content recommendation. The candidate supplemental content recommendation can include a URL of an information resource in which a candidate supplemental content item is stored. The supplemental content identification module, when executed on the computing device, can cause the computing device to update a virtual queue to include the received candidate supplemental content recommendation.

In some implementations identifying a supplemental content item can include identifying a plurality of supplemental content items. The supplemental content appending module, when executed on the computing device, can cause the computing device to generate a plurality of selectable content objects. Each of the plurality of selectable content objects corresponds to a respective candidate supplemental content item and including a respective actionable item. The supplemental content appending module, when executed on the computing device, can also cause the computing device to display a supplemental content item corresponding to that actionable item, responsive to detecting a selection of one of the plurality of actionable items corresponding to the plurality of supplemental content items.

In some implementations, the viewport monitoring module, when executed on the computing device, can cause the computing device to identify that the supplemental content item is displayed within the viewport of the application and append, another supplemental content item in a third container at a second position between the second container and the end of the information resource, responsive to identifying that the supplemental content item is displayed within the viewport of the application.

At least one aspect is directed to a method of displaying content items on an information resource responsive to scroll activity. The method includes a data processing system receiving, from an application of a client device, a request for a third-party content item to insert within an information resource of a content publisher. The method also includes the data processing system transmitting, responsive to the request, a supplemental content scroll script to display supplemental content responsive to scroll activity performed on the application. The supplemental content scroll script includes computer-executable instructions, which when executed by a processor of the client device, cause the client device to identify a supplemental content item to append to a DOM tree of the information resource, identify a first content item displayed in a first container of the information resource and monitor a position of a predetermined portion of the first content item relative to a viewport of the application. The computer-executable instructions, when executed by a processor of the client device, also cause the client device to determine, responsive to monitoring the position of the predetermined portion of the first content item, that the predetermined portion of the first content item is visible within the viewport of the application. The computer-executable instructions, when executed by a processor of the client device, also can cause the client device to append the supplemental content item in a second container at a first position between the first content item and an end of the information resource, and display the supplemental content item within the viewport of the application responsive to detecting a scroll action towards the end of the information resource.

In some implementations, the method can further include generating the second container to insert to the end of the information resource, inserting the supplemental content item within the second container, and modifying one or more setting parameters of the second container to match one or more setting parameters of the first container that includes the first content item. In some implementations, the supplemental content scroll script can be configured to cause the client device to identify that the supplemental content item is displayed within the viewport of the application, and modify a universal resource locator (URL) included in an address bar of the application from a first URL of the information resource to a second URL of another information resource corresponding to the supplemental content, responsive to identifying that the supplemental content item is displayed within the viewport of the application.

In some implementations, the supplemental content scroll script can cause the client device to identify that the supplemental content item is displayed within the viewport of the application, and, responsive to identifying that the first supplemental content item is displayed within the viewport of the application, append a another supplemental content item in a third container at a second position between the container and the end of the information resource.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
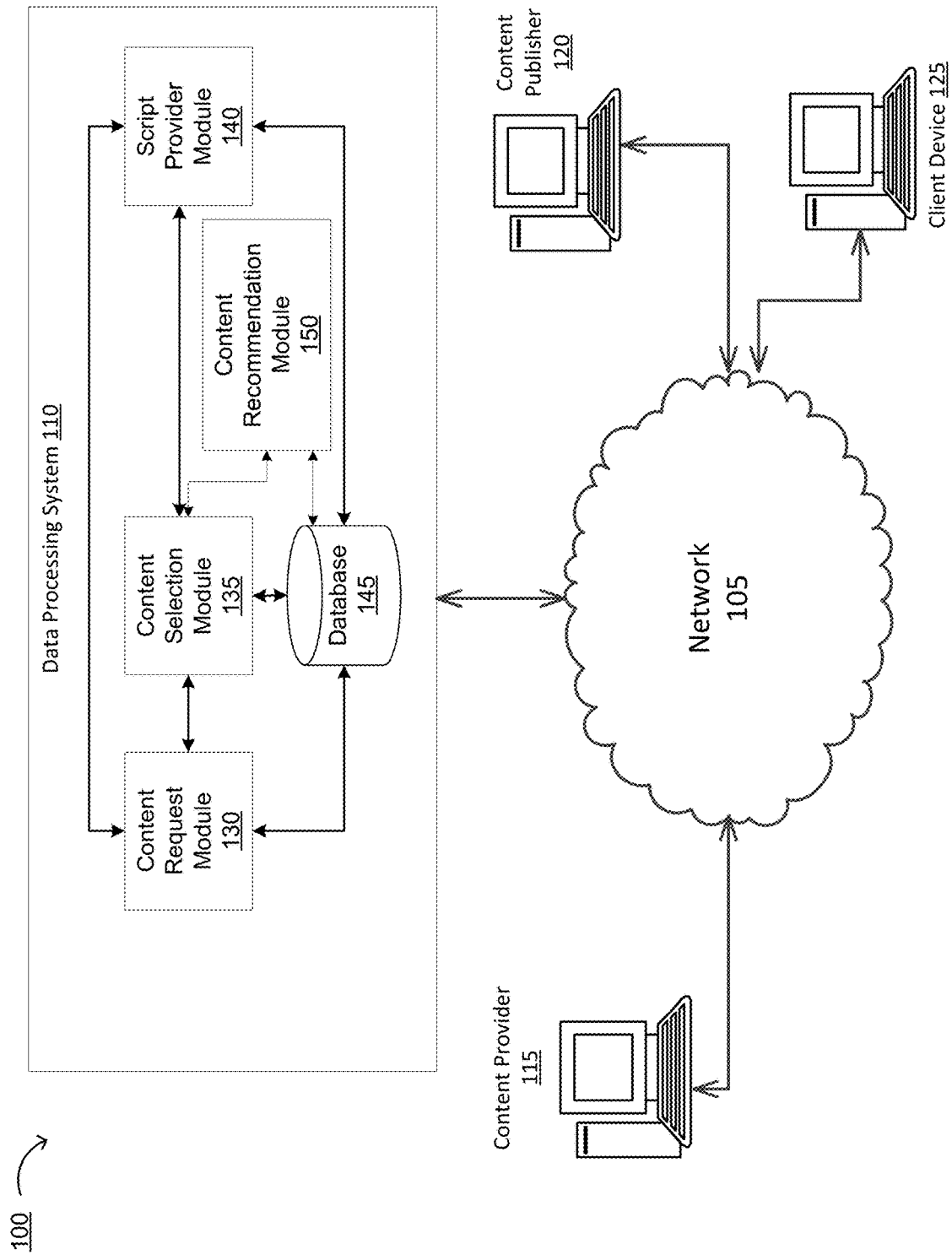
FIG. 1 is a block diagram depicting an implementation of an environment for providing content for display with information resources on client devices.

Following below are more detailed descriptions of various concepts related to, and implementations of, methods, apparatuses, and systems of dynamically appending supplemental content to an information resource responsive to scroll activity in a computer network environment. The various concepts introduced above and discussed in greater detail below may be implemented in any of numerous ways, as the described concepts are not limited to any particular manner of implementation.

As more and more people move to the online space to get news and information of interest, online publishers compete to attract users, keep them engaged and enhance online user experience. Many online users access online content through mobile devices such as smart phones or tablets. While mobile devices provide users with flexibility in terms of connectivity at various locations, fetching and navigating through content of interest to a user may not always be an easy task for the user. In particular, upon viewing (or consuming) a first content item on a web page, the user may need to navigate through two or more other web pages to find and consume other content items of interest. For instance, after reading a piece of content (such as an article or text) on a web page of a publisher, the user may need to navigate to a home page of that publisher, check what other articles of interest to the user are provided by the publisher (e.g., by scrolling up and down in the home page), and select another content item (or article) for consumption. Some users find such process annoying and tiresome and may navigate away from the publisher's website right after viewing the first piece of content.

Improving user experience can be achieved by providing a mechanism for recommending supplemental content to a user without requiring the user to access another page. Such mechanism can be provided as a service for a plurality of publishers.

In the present disclosure, a data processing system can receive, from an application of a client device, a request for a third-party content item to insert within an information resource of a content publisher. The data processing system can transmit, responsive to the request, a supplemental content scroll script to the client device to display supplemental content responsive to scroll activity performed on the application. The supplemental content scroll script can include computer executable instruction, when executed on the client device, can cause the client device to identify a supplemental content item to append to a DOM tree of the information resource, identify a first content item of the information resource, and monitor a position of the first content item relative to a viewport of the application. The computer executable instruction, when executed on the client device, can also cause the client device to determine, responsive to monitoring the position of the first content item, that the first content item is visible within the viewport of the application and append the supplemental content item at a first position between the first content item and an end of the information resource. The computer executable instruction, when executed on the client device, can also cause the client device to display the supplemental content item within the viewport of the application responsive to detecting a scroll action towards the end of the information resource.

Given a "seed page" and a set of recommended articles (such as articles on different pages of the same website as the seed page) for the seed page, the supplemental content scroll script can directly append the content of the articles to the bottom seed page so that the user doesn't need to explicitly navigate with a tap through the pages of the website. The supplemental content scroll script can append additional articles one at a time as the user continues to scroll down the page. So, from the user's point of view, there is one infinitely long page. As the user scrolls, the uniform resource locator (URL) changes in the address bar to reflect the address of the web page including the currently viewed article within the infinite page. The supplemental content scroll script can construct the infinite scroll page by loading each new article in a respective container (such as an iframe) at the bottom of the seed page, and styling that container (or iframe) to blend seamlessly with the rest of the page.

FIG. 1 is a block diagram depicting one implementation of an environment for supplemental content recommendation and scroll-based presentation. The environment 100 includes at least one data processing system 110. The data processing system 110 can include at least one processor (or a processing circuit) and a memory. The memory stores processor-executable instructions that, when executed on processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EE-PROM), erasable-programmable ROM (EPROM), flash memory, optical media, or any other suitable memory from which the processor can read instructions. The instructions may include code from any suitable computer-programming language. The data processing system 110 can include one or more computing devices or servers that can perform various functions. In some implementations, the data processing system 110 can include an advertising auction system configured to host auctions. In some implementations, the data processing system 110 does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the environment 100 can communicate via the network 105, for instance with at least one content provider computing device 115, at least one content publisher computing device 120, or at least one client device 125. The network 105 may be any form of computer network that relays information between the client device 125, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the client device 125 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items such as advertisements for display on information resources at the client device 125. The content provided by the content provider computing device 115 can include third-party content items or creatives (e.g., ads) for display on information resources, such as a website or web page that includes primary content, e.g. content provided by the content publisher computing device 120. The content items can also be displayed on a search results web page. For instance, the content provider computing device 115 can provide or be the source of ads or other content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other client device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third-party content items such as ads of the content provider computing device 115. In some implementations, the content publisher computing device 120 can include a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can include a server for serving video content.

The client devices 125 can include computing devices configured to communicate via the network 105 to display data such as the content provided by the content publisher computing device 120 (e.g., primary web page content or other information resources) and the content provided by the content provider computing device 115 (e.g., third-party content items such as ads configured for display in a content slot of a web page). The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client devices 125 can be communication devices through which an end-user can submit requests to receive content. The requests can be requests to a search engine and the requests can include search queries. In some implementations, the requests can include a request to access a web page.

The content provider computing devices 115, the content publisher computing device 120 and the client devices 125 can include a processor and a memory, i.e., a processing circuit. The memory stores machine instructions that, when executed on processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120, and the client devices 125 can also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the client devices 125 (e.g., a built-in display, microphone, etc.) or external to the housing of content provider computing devices 115, the content publisher computing device 120 and the client devices 125 (e.g., a monitor connected to the user computing device 115, a speaker connected to the user computing device 115, etc.), according to various implementations. For example, the content provider computing devices 115, the content publisher computing device 120 and the client devices 125 can include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 can include a scroll-based supplemental content insertion system, e.g., a supplemental content recommendation and presentation server or supplemental content recommendation and placement system. The data processing system 110 can include at least one content request module 130, at least one content selection module 135, at least one script provider module 140, at least one content recommendation module 150 and at least one database 145. The content request module 130, the content selection module 135 the script provider module 140, and the content recommendation module 150 each can include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the client device 125) via the network 105.

The content request module 130, the content selection module 135, the script provider module 140, and the content recommendation module 150 can include or execute at least one computer program or at least one script. The content request module 130, the content selection module 135, the script provider module 140, and the content recommendation module 150 can be separate components, a single component, or part of the data processing system 110. The content request module 130, the content selection module 135, the script provider module 140, and the content recommendation module 150 can include combinations of software and hardware, such as one or more processors configured to execute one or more scripts.

The data processing system 110 can also include one or more content repositories or databases 145. The databases 145 can be local to the data processing system 110. In some implementations, the databases 145 can be remote to the data processing system 110 but can communicate with the data processing system 110 via the network 105. The databases 145 can include information resources, third-party content items, content of one or more content publishers, among others. In some implementations, the information resources can be webpages, mobile application pages, or other documents, files, or entities that can include information. In some implementations, the database 145 can include one or more scripts, including a content recommendation script that may be used to recommend supplemental content to append to one or more information resources, or a supplemental content scroll script to append supplemental content to one or more information resources.

The content request module 130 of the data processing system 110 can be configured to receive a request for content from the client device 125. The request for content can include a request for an information resource, a request for one or more third-party content items, a request for a script, such as a supplemental content scroll script or a combination thereof. In some implementations in which the request for content includes a request for third-party content, the request can include an address or identifier for an information resource on which the third-party content is to be displayed or presented. The request for third-party content can also include or identify one or more parameters that can be used by the data processing system 110 to determine the content to provide in response to the request for third-party content. The parameters can identify a size of a content slot within which to insert the requested content. The parameters can identify a type of content associated with the information resource, a type of third-party content requested (e.g., text, image, video, etc.), client device information, size information for requested third-party content item or a combination thereof. In some implementations, the request for third-party content can identify a supplemental content scroll script. In some implementations, the request for the third-party content can include an identifier indicating that the content publisher of the resource information is subscribed to or has otherwise opted in to a supplemental content scroll service.

In some implementations, the request for content can include a request for an information resource. The request for an information resource can include an address or identifier of the information resource. For example, the request for the information resource can include a Uniform Resource Locator (URL) of a specific resource such as a webpage (e.g., "http://www.example.com"). The request for information resource can also include client device information (such as a device type, device identifier or a combination thereof).

In some implementations, the request for content can include a request for the supplemental content scroll script. In some implementations, the request for the supplemental content scroll script can include an indication of the requested script, an address or identifier of a resource information or a combination thereof. In some implementations, the request for the supplemental content scroll script can identify the supplemental content scroll script. In some implementations, the request for the supplemental content scroll script can include an identifier indicating that the content publisher of the resource information is subscribed to or has otherwise opted in to a content recommendation and supplemental content scroll service.

In some implementations, the content request module 130 can be configured to parse the request for content and determine whether to forward the request for content to the content selection module 135 or to the script provider module 140. For instance, if a supplemental content scroll script is determined to be sent to the client device 125 in response to the received request for content, the content request module 130 can forward the request for content to the script provider module 140. Otherwise, the request module 130 can forward the request for third-party content to the content selection module 135. In some implementations, the content request module 130 can determine to forward the request for content to both the content selection module 135 and the script provider module 140. The content request module 130 can determine whether or not a script is to be sent to the client device 125 based on the type of the request for content (e.g., a request for an information resource, a request for third-party content or a request for a supplemental content scroll script), an indicator in the request for content (e.g., an indicator indicative of a supplemental content scroll script or an indicator indicating that an information resource is eligible for content recommendation and supplemental content scroll), an information resource identifier in the request for content or a combination thereof. In some implementations, the content request module 130 can determine whether or not a script is to be sent to the client device 125 by comparing an identification of the information resource to a list of information resource identifiers (e.g., resource information identifiers eligible for receiving the supplemental content scroll script). In some implementations, the information resource identifier can be a URL. In some implementations, the information resource identifier can be a domain to which the information resource belongs. In some implementations, the information resource identifier can be an IP address corresponding to a server hosting the information resource. In some implementations, the content request module 130 can automatically forward the request for content to the content selection module 135 without checking whether or not a script is to be sent to the client device 125.

The content selection module 135 can be configured to determine content to be transmitted to the client device 125 in response to a received request for content. The content selection module 135 can determine the content to be sent to the client device 125 based on information included in the request for content. For instance, upon receiving a request for an information resource, the content selection module 135 can use the address or identifier of the information resource in the request for content to determine the content to send to the client device 125. In the case of receiving a request for one or more third-party content items, the content selection module 135 can select the third-party content item(s) based on an address or identifier for the information resource on which the third-party content item is to be presented, content type information (e.g., sports, news, music, movies, travel, etc.) for the information resource, size information of the slot(s) in which the third-party content item(s) is/are to be displayed, client device information (e.g., device type, device identifier, device location, etc.). In some implementations, the request for third-party content can also include a minimum revenue amount (or minimum bid value) for displaying a third-party content item on the information resource. In some implementations, the content selection module 135 can communicate with an advertising auction system and provide the advertising auction system information included in the request for third-party content received from the client device 125. The content selection module 135 can also receive one or more third-party content items (or indication(s) thereof) from the advertising auction system responsive to providing the information included in the request for third-party content to the advertising auction system. In some implementations, the content selection module 135 can access the database 145 and retrieve the content for sending to the client device 125. In some implementations, the request for content can be a request for third-party content that is received after the supplemental content scroll script is provided to a client device and executed on the client device. In some such implementations, the content selection module 135 can select one or more third-party content items for display in the content slots generated by the supplemental content scroll script.

In some implementations, the content selection module 135 can be configured to determine whether or not a script is to be sent to the client device 125 in response to the request for content. The content selection module 135 can determine whether or not a script is to be sent to the client device 125 based on the type of the content request (e.g., a request for an information resource, a request for third-party content or a request for a supplemental content scroll script), an indicator in the content request (e.g., an indicator indicative of a supplemental content scroll script or an indicator indicating that an information resource is eligible for receiving a supplemental content scroll script), an information resource identifier in the request for content or a combination thereof. In some implementations, the content selection module 135 can determine whether or not a script is to be sent to the client device 125 by comparing an identification of the information resource to a list of information resource identifiers (e.g., information resource identifiers eligible for receiving the supplemental content scroll script). Upon determining that a script is to be sent to the client device 125, the content selection module 135 can forward the request for content or an indication thereof to the script provider module 140. In some implementations, the content selection module 135 can still select a third-party content item to send to the client device 125 along with a script, such as the supplemental content scroll script.

The script provider module 140 can be configured to retrieve the supplemental content scroll script from the database 145 and transmit the retrieved script to the client device 125 (or to another entity for sending to the client device 125). In some implementations, the supplemental content scroll script can be transmitted to the client device 125 separately or with one or more third-party content items. In some implementations, the script provider module 140, the content selection module 135 or another entity of the data processing system 110 can send the supplemental content scroll script together with a requested information resource to the client device 125. For instance, the script provider module 140, the content selection module 135 or another entity of the data processing system 110 can insert the supplemental content scroll script or a portion thereof into the information resource before sending to the client device 125.

The content recommendation module 150 can receive a request for supplemental content from the client device 125 and, in response, determine one or more supplemental content items for sending to the client device 125. For instance, the supplemental content scroll script when executed on the client device 125 can cause the client device 125 to request, from the content recommendation module 150, supplemental content for appending to an information resource or a Document Object Model (DOM) tree thereof. In particular, the supplemental content scroll script can insert computer executable instructions for requesting supplemental content as an invisible element within a DOM tree or executable instructions of the information resource. Upon the client device 125 initiating display of the information resource, the computer executable instructions for requesting supplemental content are also executed causing the client device 125 to send a request to the content recommendation module 150 for supplemental content to be appended to the information resource. In some implementations, the request for supplemental content can include an address or identifier of the information resource, client device information (such as indication of device type, device identifier, device location, etc.) or a combination thereof. In some implementations, the content recommendation module 150 can determine one or more supplemental content items based on the address or identifier of the information resource, the client device information, other information included in the request for supplemental content, or other information accessible by the data processing system 110 (such as historical online activities of client device 125, historical online activities of other client devices with respect to the information resource or the first content item, information associated with the information resource and/or the information resource publisher, etc.). In some implementations, the content recommendation module 150 can determine the one or more supplemental content items from content provided (or published) by the information resource publisher. In some implementations, the content recommendation module 150 can employ information (such as a data structure, a DOM tree, etc.) corresponding to one or more information resources accessible to servers of the information resource publisher to determine one or more supplemental content items for sending to the client device 125.

Upon determining the one or more supplemental content items for sending to the client device 125, the content recommendation module 150 can access the database 145 (or communicate with the content publisher device 120) to retrieve the determined one or more supplemental content items. In some implementations, the content recommendation module 150 can send an indication of the determined one or more supplemental content items to the content selection module 135. The content selection module 135 can then retrieve the determined one or more supplemental content items from the database 145 (or other source such as the content publisher device 120) for sending to the client device 125. The content recommendation module 150, the content selection module 135 or other entity of the data processing system 110 can then transmit the one or more supplemental content items to the client device 125.

In some implementations, the content recommendation module 150 can obtain, for instance, from the database 145, information indicative of historical scroll actions associated with the client device 125 and/or information indicative of historical scroll actions by other client devices when the information resource is displayed on the other client devices. In some implementations, the content recommendation module 150 can determine a number of supplemental content items to be recommended to the client device 125 based on the information indicative of historical scroll actions associated with the client device 125 and/or the information indicative of historical scroll actions by other client devices in association with the information resource. For instance, if an information resource has been viewed by a 1000 client devices, and 900 of the views resulted in users leaving the information resource before scrolling to the end of the information resource, the content recommendation module 150 can determine that there is a high probability that a user is unlikely to scroll to the end of the information resource. As such, the content recommendation module 150 can determine to only identify one supplemental content item to append to the information resource instead of a much larger number. As a result, the content recommendation module 150 can terminate a request to identify supplemental content earlier than it would otherwise, thereby increasing the efficiency of computing resource utilization.

In some implementations, the content recommendation module 150 can determine a loading latency of the information resource (or web page) based on device information (e.g., device type, connection type, etc.) and/or information related to one or more supplemental content items (e.g., type of content, style, etc.). In some implementations, the content recommendation module 150 can determine a number of supplemental content items to be recommended to the client device 125 based on the determined loading latency.

The supplemental content scroll script can include computer-executable instructions. The computer-executable instructions can include a script, such as HyperText Markup Language (HTML), Extensible HyperText Markup Language (XHTML), Extensible Markup Language (XML), Cascading Style Sheets (CSS), and JavaScript, among others. The computer-executable instructions can be executed within an application of the client device 125, such as the application that caused the client device 125 to transmit the content request received by the content request module 130. The application can include, for example, an Internet browser, a mobile application, or any other computer program capable of reading and executing the computer-executable instructions. In brief overview, the computer-executable instructions, when executed by a processor of the client device 125, can cause an application of the client device to: (a) identify a supplemental content item to append to a Document Object Model (DOM) tree of the information resource, (b) identify a first content item of the information resource, (c) monitor a position of the first content item relative to a viewport of the application, (d) determine, responsive to monitoring the position of the first content item, that the first content item is visible within the viewport of the application, (e) append the supplemental content item at a first position between the first content item and an end of the information resource, and (f) responsive to detecting a scroll action towards the end of the information resource, display the supplemental content item within the viewport of the application. Additional details relating to the functions of the supplemental content scroll script are provided herein with respect to FIGS. 2, 3, 4, 5 and 6.

Figure 2:
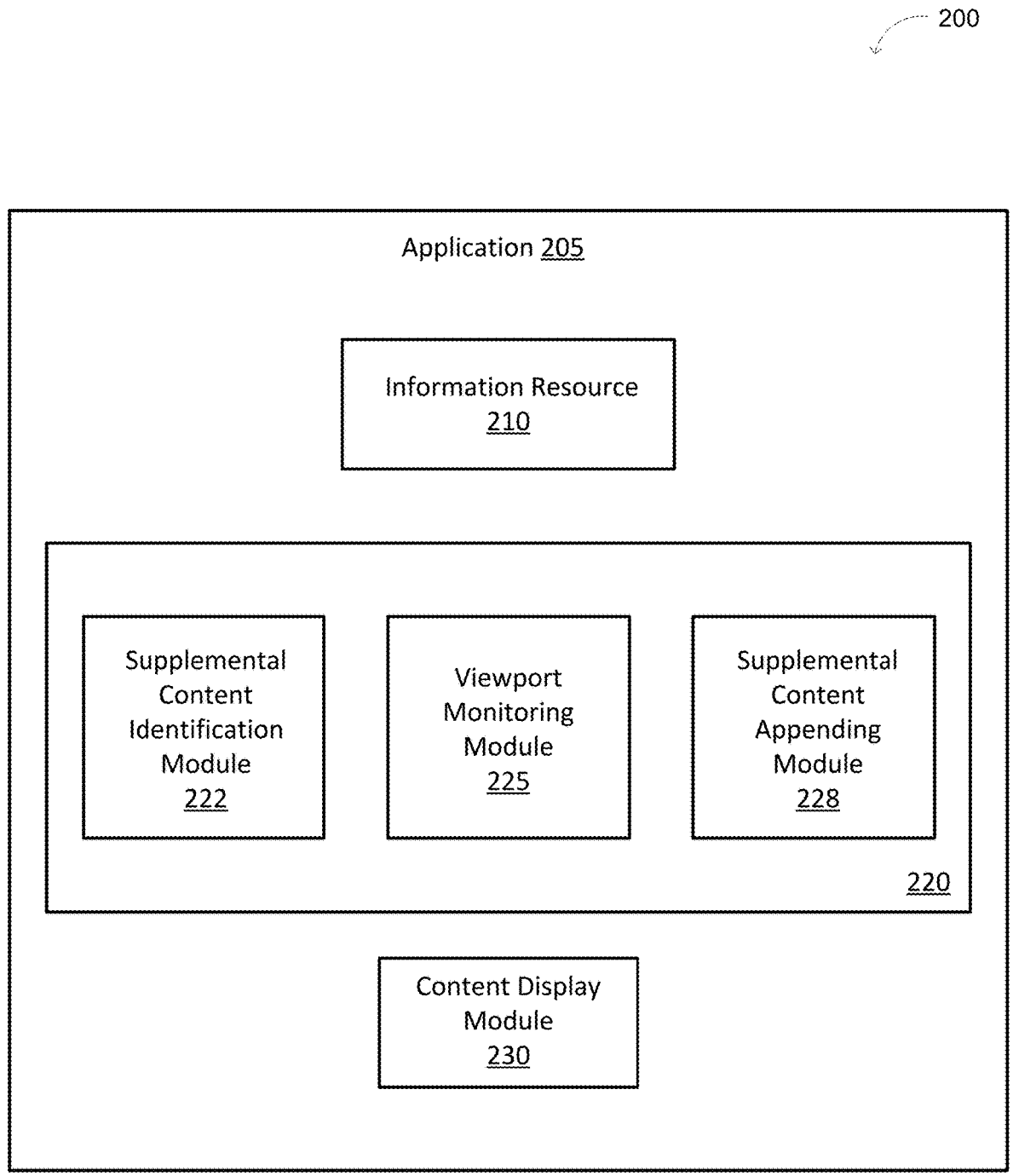
FIG. 2 is a block diagram depicting an illustrative implementation of a supplemental content scroll system for automatically inserting supplemental content to an information resource responsive to scroll activity.

Referring to FIG. 2, FIG. 2 is a block diagram depicting an illustrative implementation of a supplemental content scroll system for automatically inserting supplemental content to an information resource responsive to scroll activity. The supplemental content scroll system 200 can include an application 205, an information resource 210, a supplemental content identification module 222, a viewport monitoring module 225, a supplemental content appending module 228 and a content display module 230. In some implementations, the supplemental content identification module 222, the viewport monitoring module 225 and the supplemental content appending module 228 can be modules within a supplemental scroll script 220. The content display module 230 can be a module within the application 205. In some implementations, any of the supplemental content identification module 222, the viewport monitoring module 225, the supplemental content appending module 228 and the content display module 230 can be a module within the application 205, the information resource 210 or the supplemental scroll script 220.

The supplemental content scroll system 200 can be run or otherwise be executed on one or more processors of a computing device, such as those described below in FIG. 7. The application 205 can include, for example, an Internet browser, mobile application, or any other computer program capable of executing or otherwise invoking computer-executable instructions, such as the computer-executable instructions included in the information resource 210, the supplemental content identification module 222, the viewport monitoring module 225, the supplemental content appending module 228 and the content display module 230. The information resource 210 can include one or more content items. The content items can include primary content items provided by the content publisher, third-party content items provided by a third-party content publisher, among others. The content items can include images, text, audio, video, among others. In some implementations, a content item can include multiple content items. For instance, an article can be a content item but can include a title, one or more images, one or more paragraphs, each of which may be considered content items. The information resource 210 can specify the positions of the one or more content items. In some implementations, the information resource 210 can include a DOM tree that specifies the shape, size, positions, and/or other attributes of the one or more content items. In some implementations, the content items can correspond to DOM elements that are included in the DOM tree. In some implementations, the client device can generate the DOM tree of the information resource based on one or more computer-executable instructions, files, codes, or resources received from a server of the content publisher of the information resource.

The application 205 can obtain or receive the information resource 210 from a server hosting the information resource (such as a server of a content publisher of the information resource or a server in a data center). For instance, the application 205 can send a request including an address or an identifier of the information resource 210 to the server and, in response, receive the information resource 210. In some implementations in which the server is within (or coupled to) the data processing system 110 shown in FIG. 1, the application 205 can receive the supplemental content scroll script 220 along with the information resource 210. For instance, the application 205 can receive the supplemental content scroll script 220 inserted within the information resource 210.

In some implementations, upon receiving the information resource 210, the application 205 can send a request for content to the data processing system 110. The request for content can be a request for a third-party content item. For instance, the information resource 210 can include a third-party content slot, which can include computer-executable instructions to cause the application 205 to generate and transmit a request for content to the data processing system 110. When the computer-executable instructions of the third-party content slot are executed as part of the information resource 110, the computer-executable instructions cause the application 205 (via the client device 125) to send a request for content requesting a third-party content item from the data processing system 110. The request for content can include an address or identifier of the information resource 210, indication of the information resource content type, size information of the third-party content slot, client device information, a minimum publisher revenue value or a combination thereof. In some implementations, the request for content can include an indication of the supplemental content scroll script 220. In some implementations, the request for content can include a request for the supplemental content scroll script 220.

In response to the request for content, the application 205 can receive the supplemental content scroll script 220 from the data processing system 110 or another server. In some implementations, the application 205 can receive the supplemental content scroll script 220 together with a third-party content item. The third party content item is to be displayed within the third-party content slot that included the instructions to send the request for content to the data processing system 110. In some implementations, the application 205 can receive the supplemental content scroll script 220 with no third-party content item. In some implementations, the application 205 can receive the supplemental content scroll script 220 with a plurality of third-party content items. The application 205 (or a processor of the client device 125) can execute the supplemental content scroll script 220. In some implementations, executing the supplemental content scroll script 220 can include executing the supplemental content identification module 222, the viewport monitoring module 225, the supplemental content appending module 228, the content display module 230 or a combination thereof.

The supplemental content identification module 222 can include one or more computer-executable instructions, which can be executed on the client device 125. The supplemental content identification module 222 can cause the client device 125 to identify a supplemental content item to append to a Document Object Model (DOM) tree of the information resource 110. In some implementations, the supplemental content identification module 222 can cause the client device 125 to send, to the data processing system 110, a request for one or more supplemental content items to append to the DOM tree of the information resource 210. For instance, the supplemental content scroll script 220 can cause the client device to insert the supplemental content identification module 222 as an invisible element into the information resource 210. The supplemental content identification module 222 can be executed by the client device 125 and causes the client device 125 to send the request for the supplemental content item(s) to the content recommendation module 150 of the data processing system 110. In some implementations, the request for supplemental content can include an address or identifier of the information resource 210, client device information (such as indication of device type, device identifier, device location, etc.), information related to the publisher of the information resource or a combination thereof.

The supplemental content identification module 222 can receive one or more candidate supplemental content items (or indications thereof) from the data processing system 110. In some implementations, the supplemental content identification module 22 can receive supplemental content items responsive to the request for supplemental content. In some implementations, the supplemental content identification module 22 can receive supplemental content items responsive to the request for content transmitted by the client device when the information resource was first accessed by the client device. The candidate supplemental content items can include content items of the publisher of the information resource 210. For instance, the content recommendation module 150 can select one or more information resources from a plurality of information resources associated with the publisher the information resource 210. The content recommendation module 150 can then determine one or more content items from the selected information resource(s) for recommending to the client device 125 as candidate supplemental content items. In some implementations the plurality of information resources associated with the publisher the information resource 210 can include a plurality of pages belonging to a single domain, website, server of the publisher of the information resource 210. In some implementations, the supplemental content items can be articles, blogs, images, or other content items that may be similar to the primary content items originally included on the information resource.

In some implementations, the data processing system 110 can recommend one or more supplemental content items responsive to the request for supplemental content. The data processing system 110 can transmit one or more data packets to the supplemental content identification module 222 that can include Uniform Resource Locators (URLs) of information resources that include the candidate supplemental content items recommended by the data processing system 110. In some implementations, the data packets can include the URLs of the information resources, source codes of the information resources (or portions thereof), DOM trees of the information resources, content items (such as image or video) associated with the information resources or a combination thereof.

In some implementations, the supplemental content identification module 222 can generate, create, maintain or update one or more supplemental content queues. The supplemental content queues can include one or more supplemental content items to be appended to the information resource responsive to scroll activity performed on the information resource. In some implementations, in response to the supplemental content identification module 222 receiving the candidate supplemental content recommendations, the supplemental content identification module 222 can update one or more of the supplemental content queues to include the received candidate supplemental content recommendations. In some implementations, the supplemental content identification module 222 can forward identifiers or addresses (such as URLs), titles, images, video segments and/or other information associated with information resources storing candidate supplemental content items to the viewport monitoring module 225, the supplemental content appending module 228 or another module of the information resource 210 for updating one or more of the supplemental content queues. Each supplemental content queue can represent an ordered dynamic list of candidate supplemental content recommendations such that one or more content items associated with the list of candidate supplemental content recommendations can be appended to the information resource 210. The supplemental content queue can include a queue of the URLs (or other identifiers) of the information resources storing candidate supplemental content items. Updating the supplemental content queue can include adding identifiers (such as URLs) of the information resources storing the candidate supplemental content items to the supplemental content queue, deleting identifiers of information resources existing in the supplemental content queue, ranking (or re-ranking) identifiers of information resources in the supplemental content queue or a combination thereof. In some implementations, the supplemental content identification module 222, the viewport monitoring module 225, the supplemental content appending module 228 or another module of the information resource 210 can select a subset of the candidate supplemental content recommendations for including in virtual queue.

The viewport monitoring module 225 can be configured to cause the client device to monitor a viewport of the application to append one or more of the supplemental content items identified by the data processing system 110. The viewport monitoring module 225 can be configured to cause the client device to identify a first content item of the information resource. In some implementations, the first content item can be a content item included in the information resource when the information resource was received by the client device. In some implementations, the content item can be a DOM element. In some implementations, the content item can be a DOM element that can be rendered for display on the client device. In some implementations, the content item can be a visual representation of a DOM element that can be rendered for display on the client device. In some implementations, the content item can be a title of an article, an article itself, an image of an article, among others. In some implementations, the viewport monitoring module 225 can be configured to cause the client device to identify a title of a first article displayed on an information resource as the first content item. In some implementations, the first content item can be included in a container, such as an iframe of a DOM tree of the information resource. The first content item can be an article included in the container. In some implementations, the first content item can be any portion of an article, for instance, a header, an image, a title, among others. The container can include one or more content items. The container can be configured to style the content items in such a way that the content items correspond to a particular look and feel of the information resource.

The viewport monitoring module 225 can monitor a position of the first content item (or the predetermined portion thereof) relative to a viewport of the application. In some implementations, the viewport monitoring module 225 can monitor the position of the first content item (or the predetermined portion thereof) relative to a viewport to detect a condition in which the first content item is displayed within the viewport of the application.

In some implementations, the viewport monitoring module 225 can be configured to cause the client device to determine coordinates of the first content item (or the predetermined portion thereof) relative to a reference point of the information resource. In some implementations, the reference point of the information resource can include a top corner of the information resource. In some implementations, the viewport monitoring module 225 can determine that the information resource is configured to extend vertically or horizontally. In implementations in which the information resource is configured to extend vertically, the viewport monitoring module 225 can cause the client device to determine a coordinate value of a first content item (or the predetermined portion thereof) along the vertical axis, or stated differently, the y-axis coordinate. In implementations in which the information resource is configured to extend horizontally, the viewport monitoring module 225 can cause the client device to determine a coordinate value of a first content item (or the predetermined portion thereof) along the horizontal axis, or stated differently, the x-axis coordinate. The coordinate value can be a number of pixels, a distance, or a scaled distance from the reference point of the information resource. In some implementations, the coordinate value can be a number corresponding to a point of the first content item, for instance, a top corner of the content item. In some implementations, the point of the first content item can be any point of the first content item or corresponding to the first content item. In some implementations, the viewport monitoring module can be configured to cause the client device to identify a predefined point or portion on the content item (for instance, a center of the content item, one of the edges of the content item, one of the corners of the content item, among others). In some implementations, the viewport monitoring module can cause the client device to identify a coordinate of the first content item corresponding to an axis along which the information resource can be scrolled. For instance, if the information resource is configured to be scrolled vertically, the viewport monitoring module can cause the client device to identify one of a top edge or a bottom edge of the first content item. If the information resource is configured to be scrolled horizontally, the viewport monitoring module can cause the client device to identify one of a left edge or a right edge of the first content item.

The viewport monitoring module 225 can be configured to cause the client device to monitor coordinate values of the information resource based on the relative position of the information resource to the viewport. For instance, the viewport monitoring module 225 can cause the client device to identify a first portion of the information resource that aligns with a first edge (for instance, a top edge) of the viewport. As a user scrolls the information resource, different portions of the information resource will align with the first edge of the viewport. In some implementations, the viewport monitoring module 225 can be configured to cause the client device to periodically monitor which portion of the information resource is aligned with the top edge of the viewport and which portion of the information resource is aligned with the bottom edge of the viewport. In some implementations, the viewport monitoring module 225 can be configured to cause the client device to identify a second coordinate value of the first portion of the information resource that aligns with the top edge of the viewport and a third coordinate value of the second portion of the information resource that aligns with the bottom edge of the viewport using existing JavaScript functions. For instance, the viewport monitoring module 225 can use the function iframeElement.getBoundClientRect( ).top to identify the second coordinate value corresponding to the second portion of the information resource that is aligned with the top edge of the viewport at a particular scroll position. The function iframeElement.getBoundClientRect( ).top returns a y-coordinate identifying the first portion of the information resource that is aligned with the top edge of the viewport. In addition, the viewport monitoring module 225 can use the function iframeElement.getBoundClientRect( ).bottom to identify the third coordinate value corresponding to the second portion of the information resource that is aligned with the bottom edge of the viewport at the particular scroll position. In some implementations, the third coordinate value can be determined by adding the height of the viewport to the second coordinate value.

To determine that the first content item is visible within the viewport of the application executing on the client device, the viewport monitoring module 225 can determine whether the first coordinate value is between the second coordinate value and the third coordinate value. The viewport monitoring module 225 can be configured to compare the coordinate value of the first content item (or the predetermined portion thereof) to the top and bottom (or left and right for horizontal axis scrolling) coordinate values of the viewport. The viewport monitoring module 225 can determine that the first content item is visible within the viewport if the coordinate value of the first content item (or the predetermined portion thereof) is determined to be a number between the second and third coordinate values.

In some implementations, the viewport monitoring module can be configured to cause the client device to detect if a scroll activity occurred within the application. For instance, the viewport monitoring module 225 can be configured to receive information from the application 205 indicative of a movement (e.g., up or down) of a scroll tab of a scroll bar associated with the viewport or the information resource 210. In some implementations, the viewport monitoring module 225 can be configured to monitor a position of the scroll tab relative to the scroll bar or relative to the viewport based on, for instance, scroll information received from the application 205. In some implementations, the viewport monitoring module 225 can determine if scroll activity occurred by employing one or more listeners that detect scroll activity, including but not limited to "OnScroll," among others.

Figure 3:
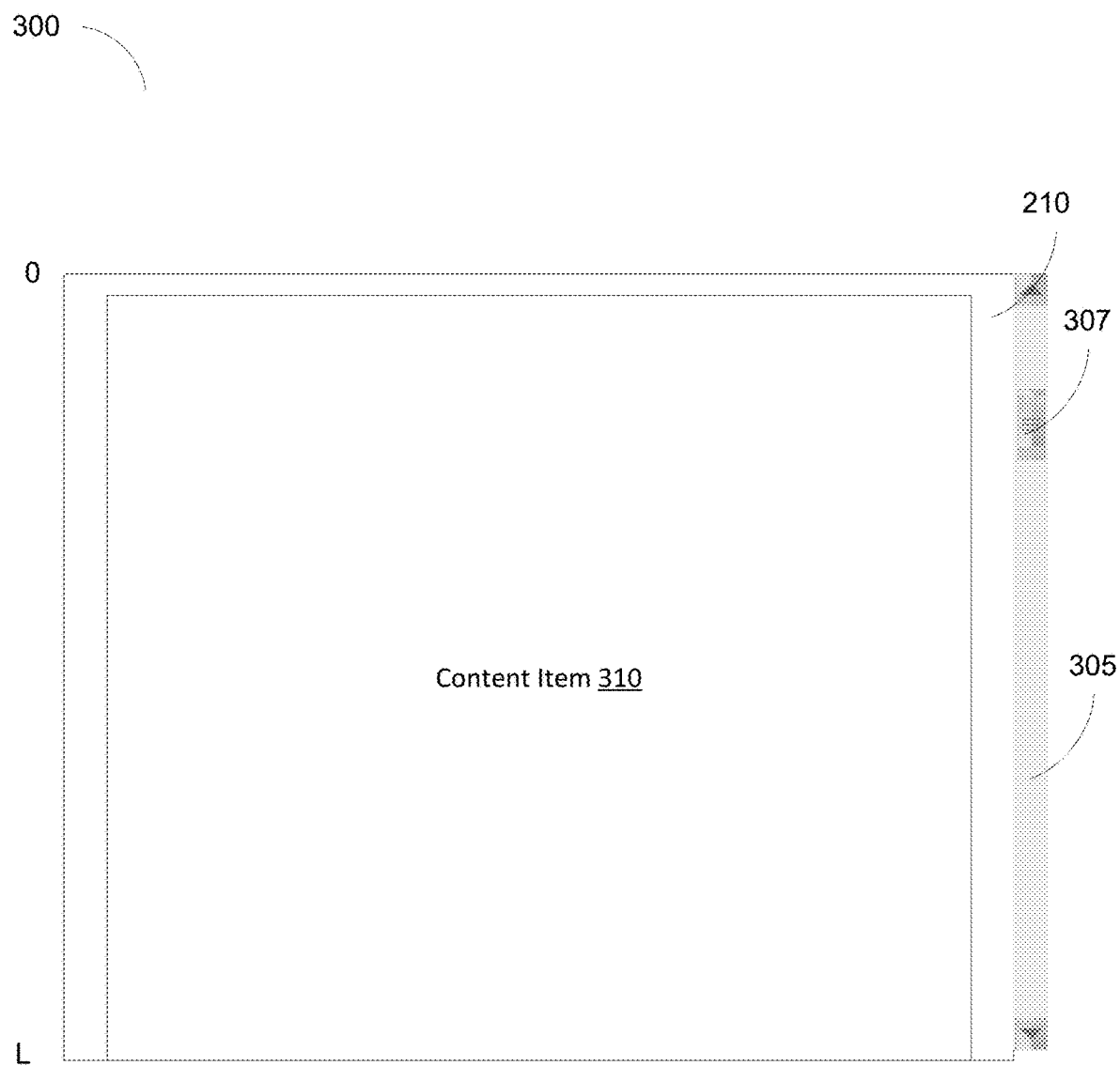
FIG. 3 is a block diagram depicting a viewport for rendering an information resource, according to an illustrative implementation.

Referring now also to FIG. 3, FIG. 3 is a block diagram depicting a viewport for rendering an information resource, according to an illustrative implementation. Coordinates along the y-axis of the viewport vary between zero and the length of the viewport L. The information resource 210 and a content item 310 thereof are rendered in the viewport 300. The viewport 300 includes a scroll bar 305 and a respective scroll tab 307. When the scroll tab 307 is moved (e.g., up or down) by a user of the client device 125, the portion of the information resource that is visible in the viewport changes accordingly. As discussed above, the viewport monitoring module 225 can determine whether the content item 310 is visible in the viewport 300 by checking whether a y-coordinate associated with the content item 310 is between 0 and L. In some implementations, the viewport monitoring module 225 can monitor movements of the scroll tab 307 or a position of the scroll tab 307 with respect to the scroll bar 305 to determine whether or not a user of the client device 125 is actively viewing the content item 310 (or the information resource 210). It should be appreciated that some computing devices may not utilize scroll tabs and scroll bars. For instance, many mobile applications may not rely on scroll bars. In some implementations, the determination of what is displayed within the viewport of the application can be based on reference points on the information resource itself.

As described herein, the viewport monitoring module can cause the client device 125 to determine that the first content item (such as content item 310) of the information resource is visible within the viewport, the viewport monitoring module 225 can generate an alert, notification, or other instructions to invoke the supplemental content appending module 228.

The supplemental content appending module 228 can be configured to cause the client device 125 to append at least one of the candidate supplemental content items at a position in the information resource between the identified content item 310 and the end of the information resource 210. For instance, the supplemental content appending module 228 can cause the client device to select the candidate supplemental content item at the top of the candidate supplemental content queue and append the selected candidate supplemental content item to the information resource 210. In some implementations, appending a candidate supplemental content item at the information resource 210 can include the supplemental content appending module 228 causing the client device to generate a container (such as an iframe) and insert the candidate supplemental content item in the generated container. The supplemental content appending module 228 can cause the client device 125 to create or modify (or adjust) one or more setting parameters (such as size parameters, background color, text font parameters, brightness, or other setting parameters) of the container to match corresponding setting parameters of another container that includes the first content item 310 in the information resource 210. Accordingly, the appended candidate supplemental content item, when displayed on the client device 125, will visually appear as if it is originally part of the information resource 210. In some implementations, the supplemental content appending module 228 can cause the client device 125 to insert a DOM element corresponding to the generated container (or iframe) in the DOM tree of the information resource 210 (e.g., at the end of the DOM tree) such that when the information resource is rendered for display via the application, the supplemental content item appears after the first content item and towards the end of the information resource.

The content display module 230 can be configured to display the appended supplemental content item within the viewport 300 upon detecting a scroll action towards the end of the information resource 210. For instance, the content display module 230 can cause the client device to receive, from the application 205 or the viewport monitoring module 225, an indication of a scroll action towards the end of the information resource 210 and, in response, causes the client device 125 (or the application 205) to display content associated with the appended supplemental content item within the viewport 300.

Figure 4:
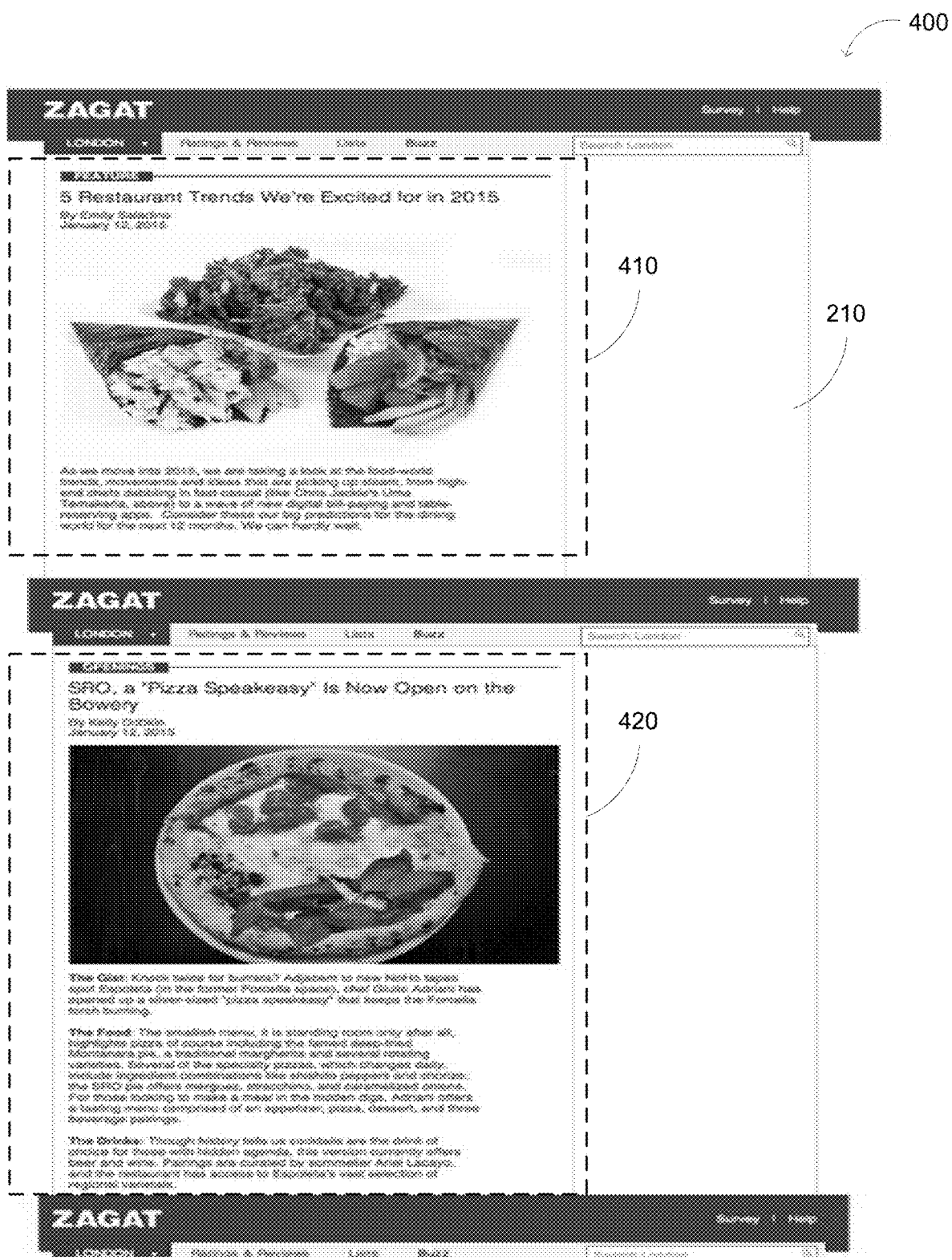
FIG. 4 shows a screen shot of a rendered resource illustrating supplemental content appended to the information resource, according to an illustrative implementation.

Referring now to FIG. 4, FIG. 4 shows a screen shot of a rendered resource illustrating supplemental content appended to the information resource, according to an illustrative implementation. In the screenshot 400, the content item 410 can be the first content item that is originally included in the information resource 210 while the content item 420 is a supplemental content item appended to the information resource 210. The content item 420 is appended to the information resource 210 at a location within the information resource that follows the original content item 410.

Responsive to a request to display the information resource (such as a publisher web page) 210 on a client device 125, the application 205 can send a request for an advertisement for display with the information resource 210 to the data processing system 110. In response to request, the application 205 can receive the supplemental content scroll script 220 along with one or more advertisements. The application 205 can execute the supplemental content scroll script 220, which, when executed, can insert an invisible content recommendation block into the information resource. The application 205 can render the content recommendation block inside an invisible container, such as an invisible iframe. The content recommendation block can send, such as via a postMessage, one or more URLs, titles, and/or images associated with recommendation content items (such as the URL, title and/or an image of the content item 420) to the supplemental content scroll script 220 running on the publisher page. The supplemental content scroll script can cause the client device or the application executing on the client device to receive the postMessage and add the recommendation content items to a virtual queue.

When a portion of the content item 410 (such as the top, title, header of an article of the content item 410) is in view (or within the viewport of the application 205), the application 205, via the supplemental content scroll script 220, can pull the next recommendation content item, such as the content item 420 off the virtual queue and append it to the bottom of the DOM tree (or DOM document) of the information resource. The top edge of an article can be defined or determined using the function iframeElement.getBoundingClientRect( ).top which returns a y-coordinate relative to the viewport of the application 205. The supplemental content scroll script 220 can determine that the returned y-coordinate is between 0 and the application viewport height defined as document.clientHeight.

In loading or otherwise inserting a recommendation content item (such as content item 420), the supplemental content scroll script 220 can cause the application to load or otherwise insert content of the recommendation content item into a new container (or iframe) that inserted at the bottom of the DOM tree (or DOM document) of the information resource. The supplemental content scroll script 220 can style the container (or iframe) to be full-width and have no border. When the content item 420 (via corresponding article) is done loading, the application 205 (via the supplemental content scroll script 220) can resize the container (or iframe) to fit the article length. The application 205 (via the supplemental content scroll script 220) can modify all anchor tags with target=_self (the default target) inside the container (or iframe) need to target=_top so that links are opened in the parent window (such as the window where the content item 410 is displayed). Also, if the content item 420 is in view, the application 205 (via the supplemental content scroll script 220) can update the URL in the address bar to reflect the address of the content item 420.

Figure 5:
FIG. 5 shows a screen shot of a rendered information resource illustrating supplemental content appended to the information resource, according to another illustrative implementation.

FIG. 5 shows a screen shot of a rendered information resource illustrating supplemental content appended to the information resource, according to another illustrative implementation. In the screen shot 500, the content item 510 can be an original content item of the information resource 210 while the content item 520 is an appended content item. According to the implementation illustrated in FIG. 5, the supplemental content appending module 228 can generate a plurality of selectable content objects, such as content objects 525, 535 and 545, each corresponding to a respective supplemental content item. In some implementations, each of the selectable content objects 525, 535, and 545 can be included in a content object 550, which the supplemental content appending module 228 can insert into the information resource or in a new container (such as a new iframe).

Each of the plurality of selectable content objects 525, 535 and 545 can include an actionable item to select the corresponding supplemental content item to append to the information resource and/or display in the viewport. For instance, upon the client device detecting a click, tap, touch, or hover over (by a cursor) on one of the plurality of actionable items included in the selectable content objects 525, 535 and 545, the respective supplemental content item can be made available for display within the viewport.

In some implementations, the supplemental content appending module 228 can append all the supplemental content items associated with the selectable content objects 525, 535 and 545 to the information resource. The supplemental content appending module 228 can insert a new container (such as an iframe) between the content item 410 and the end of the publisher web page, and load all the supplemental content items associated with the selectable content objects 525, 535 and 545 into the container (or iframe). The selectable content objects 525, 535 and 545 can be arranged in the new container. In some implementations, the supplemental content appending module 228 can set the properties of each of the supplemental content items such that only the supplemental content item corresponding to the selected actionable item (and by association, the selectable content object) is visible at any given time, while the others are set to be hidden. The supplemental content appending module 228 can load the supplemental content item associated with the corresponding to the selected actionable item into the new container (or iframe). In some implementations, the supplemental content appending module 228 can append (such as insert in the new container or iframe) a supplemental content item corresponding to a default selectable content object 525 to the information resource and make the supplemental content item available for display in the viewport. Upon the client device detecting a selection of a selectable content object not currently displayed (e.g., selecting selectable content object 535 or 545) the supplemental content appending module 228 can cause the client device to change the properties of the supplemental content item corresponding to the default selectable content object 525 (or a DOM element corresponding thereto) from visible to invisible, while making the supplemental content item (or DOM element corresponding thereto) whose actionable item was selected to a visible state. In some implementations, the supplemental content appending module 228 can replace the supplemental content item currently in the new container (or iframe) with the supplemental content item whose actionable item was selected. In this way, the supplemental content item whose actionable item was selected becomes visible such that when the portion of the information resource that includes the supplemental content item lies within the viewport of the application 205, the supplemental content item whose actionable item was selected can be viewed.

In some implementations, the viewport monitoring module 225 can cause the client device 125 to periodically or constantly monitor the viewport to determine when the supplemental content item can be viewed through the viewport. In response to identifying that the supplemental content item can be viewed through the viewport, the application 205 or the viewport monitoring module 225 can cause the client device to modify a universal resource locator (URL) included in an address bar of the application 205 from a first URL of the first information resource 210 to a second URL of a second information resource corresponding to the appended and displayed supplemental content item. In other words, as scrolling events occur, the application 205 or the viewport monitoring module 225 can cause the client device 125 to monitor which content item (or corresponding iframe) is visible in the viewport and determine a URL of the information resource associated with the visible content item. The URL of the information resource associated with visible content item can then be displayed in the address bar of the application 205.

In some implementations, the viewport monitoring module 225 can cause the client device to detect that a scroll event has occurred, and responsive to the client device 125 detecting that the scroll event has occurred, the viewport monitoring module 225 can cause the client device 125 to determine which, if any, of the supplemental content items is visible through the viewport of the application 205. The client device 125 can determine this by comparing coordinates of one or more portions of the supplemental content items with the coordinates of one or more edges of the viewport. Responsive to the client device 125 determining the identity of the supplemental content item viewable through the viewport, the viewport monitoring module 225 can cause the client device 125 to modify the top window's window.location object to match the window.location object of the container (or iframe) of the supplemental content item.

In some implementations, the supplemental content scroll script 220 can cause the client device 125 to append supplemental content items to an information resource in which one or more supplemental content items have already been appended. In some implementations, the supplemental content scroll script 220 can define a maximum threshold of supplemental content items to append to the information resource. In some implementations, the supplemental content scroll script 220 may not define a maximum, and as a result, the client device 125 can be configured to append a very large number of supplemental content items responsive to scroll activity.

In some implementations, the supplemental content scroll script 220 can include computer-executable instructions, which when executed by the client device can cause the client device 125 to identify that a supplemental content item is displayed through the viewport, detect a scroll action and responsive to the scroll action, cause the client device 125 to append another supplemental content item to the information resource. Appending another supplemental content item to the information resource can include inserting a new (or an additional) container (or iframe) in the information resource (or the respective DOM tree) and loading the other supplemental content item in the inserted container (or iframe). In some implementations, the client device 125 can append multiple supplemental content items to the information resource. In some implementations, the supplemental content scroll script 220 can set a predetermined number of supplemental content items to append relative to the supplemental content item displayed in the viewport. For instance, if the predetermined number is 3 and the supplemental content item that is displayed through the viewport is the fourth supplemental content appended to the information resource, the client device 125 can be configured such that there are a total of seven supplemental content items included in the information resource. As the user scrolls towards the fifth, another supplemental content item can be appended. If no predetermined (or maximum) number of supplemental content items is set, the supplemental content scroll script 220 (or the application 205) can keep appending new supplemental content items as more scroll activity (for example towards the end of the information resource) is detected.

Figure 6:
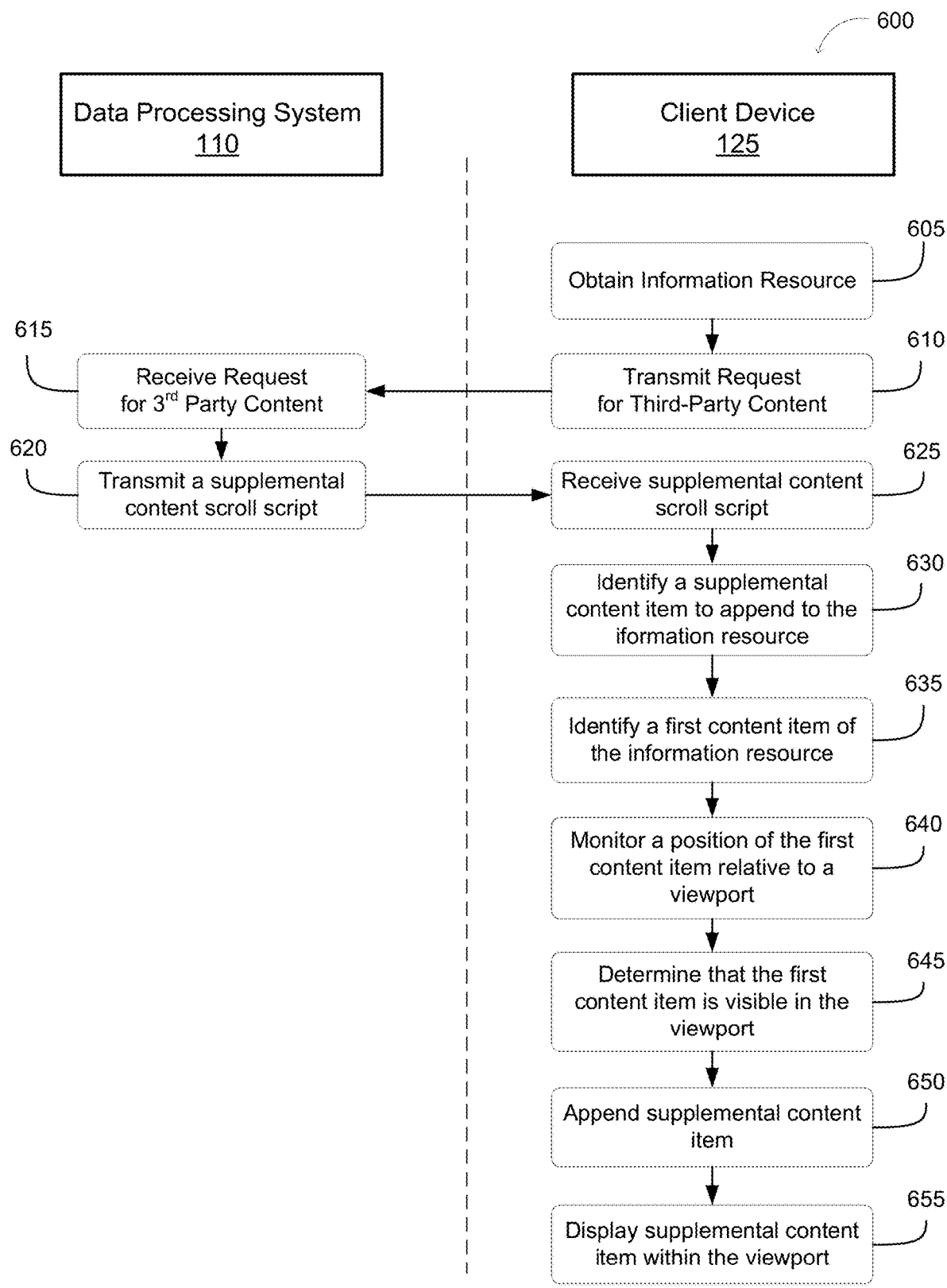
FIG. 6 is flow diagram depicting a method for dynamically appending supplemental content to an information resource responsive to scroll activity, according to an illustrative implementation.

FIG. 6 is flow diagram depicting a method for dynamically appending supplemental content to an information resource responsive to scroll activity, according to an illustrative implementation. The functionality described herein with respect to method 400 can be performed or otherwise executed by the data processing system 110 or client device 125 as shown in FIG. 1 or the supplemental content scroll system 200 as shown in FIG. 2, or the computing device 700 as shown in FIG. 7, or any combination thereof. In particular, FIG. 6 depicts the functionalities of the method 600 distributed between the data processing system 110 and the client device 125. In brief overview, a client device obtains an information resource (BLOCK 605). The client device transmits a request for content to the data processing system (BLOCK 610). The data processing system can receive the request for content from the client device (BLOCK 615). The data processing system can transmit a supplemental content scroll script to the client device (BLOCK 620). The client device can receive the content with the supplemental content scroll script from the data processing system (BLOCK 625). The client device can identify a supplemental content item to append to a DOM tree of the information resource (BLOCK 630). The client device can identify a first content item of the information resource (BLOCK 635). The client device can monitor a position of the first content item relative to a viewport of the application (BLOCK 640). The viewport monitoring module can be configured to cause the client device to determine that the first content item is visible within the viewport of the application (BLOCK 645). The client device can append the supplemental content item at a first position between the first content item and an end of the information resource (BLOCK 650). The client device can display the supplemental content item within the viewport of the application responsive to detecting a scroll action towards the end of the information resource (BLOCK 655).

In further detail, the client device obtains an information resource (BLOCK 605). An application executing on the client device can obtain or receive the information resource from a server hosting the information resource (such as a server of a content publisher of the information resource or a server in a data center). For instance, the application can generate and send a request including an address or an identifier of the information resource to the server and, in response, receive the information resource.

The client device transmits a request for content to the data processing system (BLOCK 610) and the data processing system can receive the request for content from the client device (BLOCK 615). The request for content can be generated and transmitted by the application executing on the client device responsive to the client device receiving the requested information resource. In some implementations, the application can generate the request for content responsive to a script executing in a content object (content slot) included in the information resource. The content object can include instructions to generate a request to receive content from the data processing system.

The request for content can include a request for an information resource, a request for one or more third-party content items, a request for a script, such as a supplemental content scroll script or a combination thereof. In some implementations in which the request for content includes a request for third-party content, the request can include an address or identifier for an information resource on which the third-party content is to be displayed or presented. The request for third-party content can also include or identify one or more parameters that can be used by the data processing system to determine the content to provide in response to the request for third-party content. The parameters can identify a size of a content slot within which to insert the requested content. The parameters can identify a type of content associated with the information resource, a type of third-party content requested (e.g., text, image, video, etc.), client device information, size information for requested third-party content item or a combination thereof. In some implementations, the request for third-party content can identify a supplemental content scroll script. In some implementations, the request for the third-party content can include an identifier indicating that the content publisher of the resource information is subscribed to or has otherwise opted in to a supplemental content scroll service.

The data processing system can transmit a supplemental content scroll script to the client device (BLOCK 620) and the client device can receive the supplemental content scroll script from the data processing system (BLOCK 625). The data processing system can determine content to transmit to the client device in response to the received request for content. The data processing system can determine the content to be sent to the client device based on information included in the request for content. For instance, upon receiving a request for an information resource, the data processing system can use the address or identifier of the information resource in the request for content to determine the content to send to the client device.

In some implementations, the data processing system can access the database of the data processing system and retrieve the content for sending to the client device. In some implementations, the request for content can be a request for third-party content that is received after the supplemental content scroll script is provided to a client device and executed on the client device. In some such implementations, the content selection module 135 can select one or more third-party content items for display in the content slots generated by the supplemental content scroll script.

The data processing system can determine whether or not a script is to be sent to the client device based on the type of the request for content (e.g., a request for an information resource, a request for third-party content or a request for a supplemental content scroll script), an indicator in the request for content (e.g., an indicator indicative of a supplemental content scroll script or an indicator indicating that an information resource is eligible for content recommendation and supplemental content scroll), an information resource identifier in the request for content or a combination thereof. In some implementations, the data processing system can determine whether or not a script is to be sent to the client device by comparing an identification of the information resource to a list of information resource identifiers (e.g., resource information identifiers eligible for receiving the supplemental content scroll script). In some implementations, the information resource identifier can be a URL. In some implementations, the information resource identifier can be a domain to which the information resource belongs. In some implementations, the information resource identifier can be an IP address corresponding to a server hosting the information resource.

The client device can execute the supplemental content scroll script to perform the functionality of BLOCKS 630-655. The client device, by executing the supplemental content scroll script, can identify a supplemental content item to append to a DOM tree of the information resource (BLOCK 630). The client device can identify a supplemental content item to append to a Document Object Model (DOM) tree of the information resource. In some implementations, the client device can send, to the data processing system, a request for one or more supplemental content items to append to the DOM tree of the information resource. For instance, the supplemental content scroll script can cause the client device to insert the supplemental content identification module 222 as an invisible element into the information resource. The client device 125 can send the request for the supplemental content item(s) to a content recommendation module of the data processing system 110. In some implementations, the request for supplemental content can include an address or identifier of the information resource, client device information (such as indication of device type, device identifier, device location, etc.), information related to the publisher of the information resource or a combination thereof.

The client device can receive one or more candidate supplemental content items (or indications thereof) from the data processing system responsive to the request for supplemental content. In some implementations, the client device can receive supplemental content items responsive to the request for supplemental content. In some implementations, the client device can receive one or more candidate supplemental content items responsive to the request for content transmitted by the client device when the information resource was first accessed by the client device. The candidate supplemental content items can include content items of the publisher of the information resource published on one or more other information resources of the publisher. In some implementations the plurality of information resources associated with the publisher the information resource can include a plurality of pages belonging to a single domain, website, server of the publisher of the information resource. In some implementations, the supplemental content items can be articles, blogs, images, or other content items that may be similar to the primary content items originally included on the information resource.

In some implementations, the data processing system can recommend one or more supplemental content items responsive to the request for supplemental content. The data processing system can transmit one or more data packets to the client device that can include Uniform Resource Locators (URLs) of information resources that include the candidate supplemental content items recommended by the data processing system. In some implementations, the data packets can include the URLs of the information resources, source codes of the information resources (or portions thereof), DOM trees of the information resources, content items (such as image or video) associated with the information resources or a combination thereof.

The client device can identify a first content item of the information resource (BLOCK 635). In some implementations, the viewport monitoring module of the supplemental content scroll script can be configured to cause the client device to identify a first content item of the information resource. In some implementations, the first content item can be a content item included in the information resource when the information resource was received by the client device. In some implementations, the content item can be a DOM element. In some implementations, the content item can be a DOM element that can be rendered for display on the client device. In some implementations, the content item can be a title of an article, an article itself, an image of an article, among others. In some implementations, the viewport monitoring module can be configured to cause the client device to identify a title of a first article displayed on an information resource as the first content item.

The client device can monitor a position of the first content item (or a predetermined portion thereof) relative to a viewport of the application (BLOCK 640). The predetermined portion of the first content item can include a title of an article, a header of an article, an image of an article amongst others. In some implementations, the viewport monitoring module can monitor the position of the first content item (or the predetermined portion thereof) relative to a viewport to detect a condition in which the first content item is displayed within the viewport of the application. In some implementations, the viewport monitoring module can be configured to cause the client device to determine coordinates of the first content item (or the predetermined portion thereof) relative to a reference point of the information resource. In some implementations, the reference point of the information resource can include a top corner of the information resource. In some implementations, the viewport monitoring module can determine that the information resource is configured to extend vertically or horizontally. In implementations in which the information resource is configured to extend vertically, the viewport monitoring module can cause the client device to determine a coordinate value of the first content item (or the predetermined portion thereof) along the vertical axis, or stated differently, the y-axis coordinate. In implementations in which the information resource is configured to extend horizontally, the viewport monitoring module can cause the client device to determine a coordinate value of a first content item (or the predetermined portion thereof) along the horizontal axis, or stated differently, the x-axis coordinate. The coordinate value can be a number of pixels, a distance, or a scaled distance from the reference point of the information resource. In some implementations, the coordinate value can be a number corresponding to a point of the first content item (or the predetermined portion thereof), for instance, a top corner of the content item (or the predetermined portion thereof). In some implementations, the point of the first content item (or the predetermined portion thereof) can be any point of the first content item, the predetermined portion of the first content item, or any point corresponding to the first content item or the predetermined portion thereof. In some implementations, the viewport monitoring module can be configured to cause the client device to identify a predefined point on the content item or the predetermined portion of the first content item (for instance, a center of the content item or the predetermined portion, one of the edges of the content item or the predetermined portion, one of the corners of the content item or the predetermined portion, among others). In some implementations, the viewport monitoring module can cause the client device to identify a coordinate of an edge of the first content item (or the predetermined portion thereof) corresponding to an axis along which the information resource can be scrolled. For instance, if the information resource is configured to be scrolled vertically, the viewport monitoring module can cause the client device to identify one of a top edge or a bottom edge of the first content item (or the predetermined portion thereof). If the information resource is configured to be scrolled horizontally, the viewport monitoring module can cause the client device to identify one of a left edge or a right edge of the first content item (or the predetermined portion thereof).

The viewport monitoring module can be configured to cause the client device to monitor coordinate values of the information resource based on the relative position of the information resource to the viewport. For instance, the viewport monitoring module can cause the client device to identify a first portion of the information resource that aligns with a first edge (for instance, a top edge) of the viewport. As a user scrolls the information resource, different portions of the information resource will align with the first edge of the viewport. In some implementations, the viewport monitoring module can be configured to cause the client device to periodically monitor which portion of the information resource is aligned with the top edge of the viewport and which portion of the information resource is aligned with the bottom edge of the viewport. In some implementations, the viewport monitoring module can be configured to cause the client device to identify a second coordinate value of the first portion of the information resource that aligns with the top edge of the viewport and a third coordinate value of the second portion of the information resource that aligns with the bottom edge of the viewport using existing JavaScript functions. For instance, the viewport monitoring module can use the function iframeElement.getBoundClientRect( ).top to identify the second coordinate value corresponding to the second portion of the information resource that is aligned with the top edge of the viewport at a particular scroll position. The function iframeElement.getBoundClientRect( ).top returns a y-coordinate identifying the first portion of the information resource that is aligned with the top edge of the viewport. In addition, the viewport monitoring module can use the function iframeElement.getBoundClientRect( ).bottom to identify the third coordinate value corresponding to the second portion of the information resource that is aligned with the bottom edge of the viewport at the particular scroll position. In some implementations, the third coordinate value can be determined by adding the height of the viewport to the second coordinate value.

The viewport monitoring module can be configured to cause the client device to determine that the first content item (or the predetermined portion thereof) is visible within the viewport of the application (BLOCK 645). To determine that the first content item (or the predetermined portion thereof) is visible within the viewport of the application executing on the client device, the viewport monitoring module can cause the client device to determine whether the first coordinate value is between the second coordinate value and the third coordinate value. The viewport monitoring module can be configured to cause the client device to compare the coordinate value of the first content item (or the predetermined portion thereof) to the top and bottom (or left and right for horizontal axis scrolling) coordinate values of the viewport. The viewport monitoring module 225 can determine that the first content item (or the predetermined portion thereof) is visible within the viewport if the coordinate value of the first content item is determined to be a number between the second and third coordinate values.

In some implementations, the viewport monitoring module can be configured to cause the client device to detect if a scroll activity occurred within the application. For instance, the viewport monitoring module can be configured to receive information from the application executing on the client device indicative of a movement (e.g., up or down) of a scroll tab of a scroll bar associated with the viewport or the information resource. In some implementations, the viewport monitoring module can be configured to cause the client device to monitor a position of the scroll tab relative to the scroll bar or relative to the viewport based on, for instance, scroll information received from the application. In some implementations, the viewport monitoring module can determine if scroll activity occurred by employing one or more listeners that detect scroll activity, including but not limited to "OnScroll," among others.

The client device can append the supplemental content item at a first position between the first content item and an end of the information resource (BLOCK 650). The supplemental content appending module of the supplemental content scroll script can be configured to cause the client device to append at least one of the candidate supplemental content items at a position in the information resource between the identified content item and the end of the information resource 210. For instance, the supplemental content appending module can cause the client device to select the candidate supplemental content item at the top of the candidate supplemental content queue and append the selected candidate supplemental content item to the information resource. Appending a supplemental content item at the information resource can include the supplemental content appending module causing the client device to generate and/or insert a new container (such as a new iframe) and insert (or load) the candidate supplemental content item in the new container (or iframe). The supplemental content appending module can cause the client device to modify (or adjust) one or more setting parameters (such as size parameters, background color, text font parameters, brightness, or other setting parameters) of the container (or the iframe) to match corresponding setting parameters of another container (or another iframe) that includes the first content item in the information resource. For instance, the client device can style the new container (or new iframe) to be full-width and/or have no border. Accordingly, the appended candidate supplemental content item, when displayed on the client device, will visually appear as if it is originally part of the information resource. When the supplemental content item is done loaded in the new container, the client device can resize the new container (or new iframe) to fit the length of the supplemental content item. The client device can modify all anchor tags with target=_self (the default target) inside the new container (or new iframe) to target=_top so that links are opened in the parent window (such as the window where the content item 410 is displayed). Also, if the content item 420 is in view, the application 205 (or the supplemental content scroll script 220) can update the URL in the address bar to reflect the address of the content item 420. In some implementations, the supplemental content appending module 228 can cause the client device to insert a DOM element corresponding to the generated new container (or iframe) in the DOM tree of the information resource (e.g., at the end of the DOM tree) such that when the information resource is rendered for display via the client device, the supplemental content item appears after the first content item and towards the end of the information resource.

The client device can display the supplemental content item within the viewport of the application responsive to detecting a scroll action towards the end of the information resource (BLOCK 655). The content display module can be configured to display the appended supplemental content item within the viewport upon detecting a scroll action towards the end of the information resource. For instance, the content display module can cause the client device to receive, from the application or the viewport monitoring module, an indication of a scroll action towards the end of the information resource and, in response, causes the client device (or the application) to display content associated with the appended supplemental content item within the viewport.

In some implementations, the viewport monitoring module 225 can cause the client device to detect that a scroll event has occurred, and responsive to the client device 125 detecting that the scroll event has occurred, the viewport monitoring module 225 can cause the client device to determine which, if any, of the supplemental content items is visible through the viewport of the application. The client device can determine this by comparing coordinates of one or more portions of the supplemental content items with the coordinates of one or more edges of the viewport. Responsive to the client device determining the identity of the supplemental content item viewable through the viewport, the viewport monitoring module 225 can cause the client device to modify the top window's window.location object to match the window.location object of the container (or iframe) of the supplemental content item.

In some implementations, the supplemental content scroll script can cause the client device to append additional supplemental content items in one or more additional containers to an information resource in which one or more supplemental content items have already been appended in one or more respective containers. In some implementations, the supplemental content scroll script can define a maximum threshold of supplemental content items to append to the information resource. In some implementations, the supplemental content scroll script may not define a maximum, and as a result, the client device can be configured to append a very large number of supplemental content items responsive to scroll activity.

In some implementations, the supplemental content scroll script can include computer-executable instructions, which when executed by the client device can cause the client device to identify that a supplemental content item is displayed through the viewport, detect a scroll action and responsive to the scroll action, cause the client device to append a supplemental content item in another respective container to the information resource. Appending another supplemental content item to the information resource can include inserting a new (or an additional) container (or iframe) in the information resource (or the respective DOM tree) and loading the other supplemental content item in the inserted container (or iframe). In some implementations, the client device can append multiple supplemental content items to the information resource. In some implementations, the supplemental content scroll script can set a predetermined number of supplemental content items to append relative to the supplemental content item displayed in the viewport. For instance, if the predetermined number is 3 and the supplemental content item that is displayed through the viewport is the fourth supplemental content appended to the information resource, the client device can be configured such that there are a total of seven supplemental content items included in the information resource. As the user scrolls towards the fifth, another supplemental content item can be appended (such as in a respective added container). If no predetermined (or maximum) number of supplemental content items is set, the supplemental content scroll script 220 (or the application 205) can keep appending new supplemental content items as more scroll activity (for example towards the end of the information resource) is detected.

Figure 7:
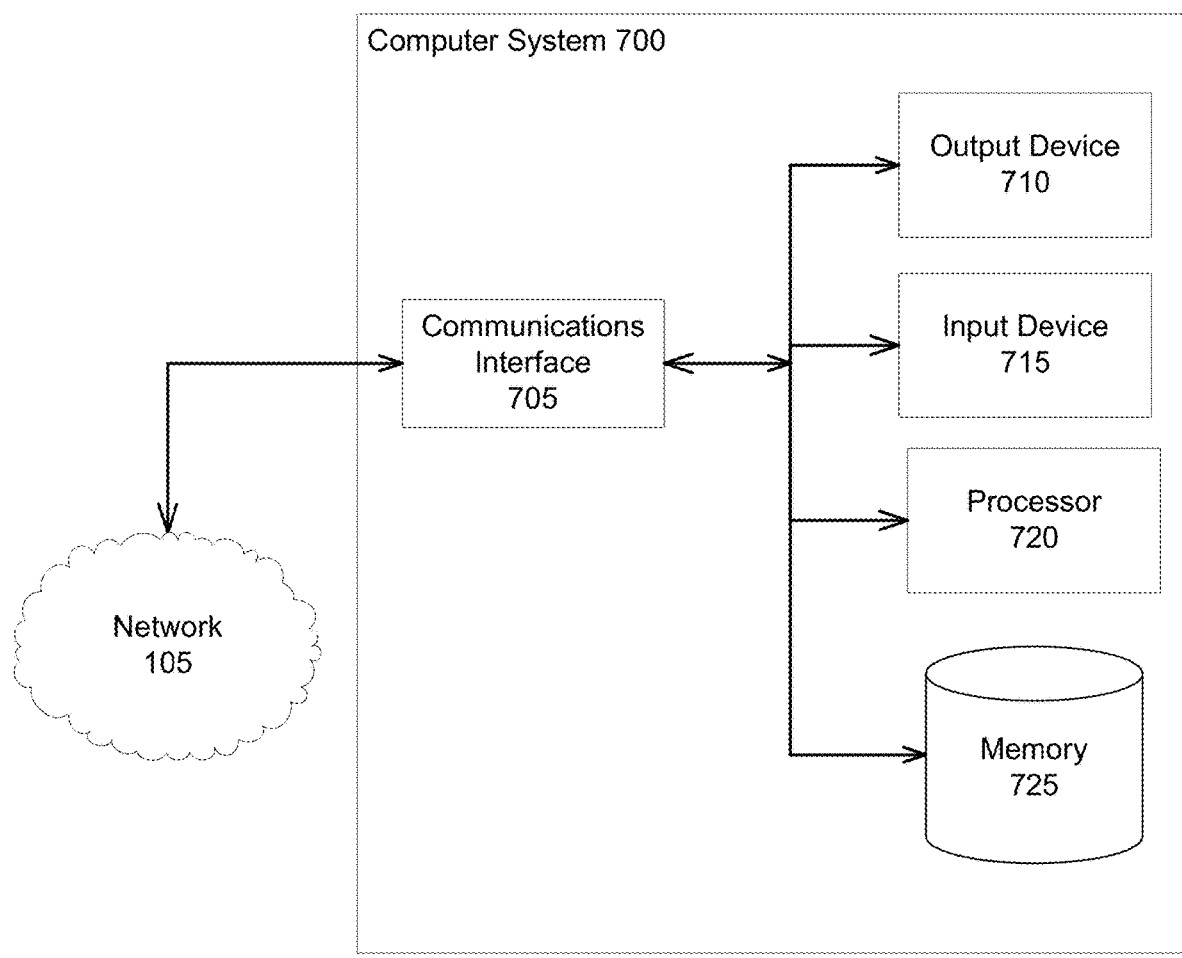
FIG. 7 is a block diagram depicting an illustrative implementation of a general architecture for a computer system that may be employed to implement elements of the systems and methods described and illustrated herein.

FIG. 7 shows the general architecture of an illustrative computer system 700 that may be employed to implement any of the computer systems discussed herein (including the system 110 and its components such as the content request module 130, the content selection module 135, and script provider module 140) in accordance with some implementations. The computer system 700 can be used to provide information via the network 105 for display. The computer system 700 of FIG. 7 comprises one or more processors 720 communicatively coupled to memory 725, one or more communications interfaces 705, and one or more output devices 710 (e.g., one or more display units) and one or more input devices 715. The processors 720 can be included in the data processing system 110 or the other components of the system 110 such as the content request module 130 and the content selection module 135.

In the computer system 700 of FIG. 7, the memory 725 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 725 to store information related to the availability of inventory of one or more content units, reservations of one or more content units, among others. The memory 725 can include the database 145. The processor(s) 720 shown in FIG. 7 may be used to execute instructions stored in the memory 725 and, in so doing, also may read from or write to the memory various information processed and or generated pursuant to execution of the instructions.

The processor 720 of the computer system 700 shown in FIG. 7 also may be communicatively coupled to or control the communications interface(s) 705 to transmit or receive various information pursuant to execution of instructions. For example, the communications interface(s) 705 may be coupled to a wired or wireless network, bus, or other communication means and may therefore allow the computer system 700 to transmit information to or receive information from other devices (e.g., other computer systems). While not shown explicitly in the system of FIG. 1, one or more communications interfaces facilitate information flow between the components of the system 70. In some implementations, the communications interface(s) may be configured (e.g., via various hardware components or software components) to provide a website as an access portal to at least some aspects of the computer system 700. Examples of communications interfaces 705 include user interfaces (e.g., web pages), through which the user can communicate with the data processing system 70.

The output devices 710 of the computer system 700 shown in FIG. 7 may be provided, for example, to allow various information to be viewed or otherwise perceived in connection with execution of the instructions. The input device(s) 715 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content request module 130 and the content selection module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 700 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130 and the content selection module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A system for displaying content items on an information resource of a content publisher, comprising:
   at least one processor; and
   a memory storing a supplemental content scroll script, the supplemental content scroll script when executed on the one or more processors causes the system to:
   identify a supplemental content item to append to a Document Object Model (DOM) tree of the information resource;
   identify a first content item displayed within a first container of the information resource;
   monitor a position of a predetermined portion of the first content item relative to a viewport of an application;
   determine, responsive to monitoring the position of the predetermined portion of the first content item, that the predetermined portion of the first content item is visible within the viewport of the application;
   append, responsive to determining that the predetermined portion of the first content item is visible within the viewport of the application, the supplemental content item in a second container at a first position between the first container and an end of the information resource; and
   responsive to detecting a scroll action towards the end of the information resource, display the supplemental content item within the viewport of the application.

2. The system of claim 1, wherein the information resource includes a first information resource and wherein the supplemental content scroll script is configured to cause the system to select the supplemental content item from a plurality of supplemental content items existing in second information resources of the content publisher.

3. The system of claim 1, wherein the supplemental content scroll script is configured to cause the system to:
   generate the second container to insert to the end of the information resource;
   insert the supplemental content item within the second container; and
   modify one or more setting parameters of the second container to match one or more setting parameters of the first container that includes the first content item.

4. The system of claim 1, wherein the information resource is a first information resource, and wherein the supplemental content scroll script is configured to cause the system to:
   identify that the supplemental content item is displayed within the viewport of the application; and
   modify a universal resource locator (URL) included in an address bar of the application from a first URL of the first information resource to a second URL of a second information resource corresponding to the supplemental content responsive to identifying that the supplemental content item is displayed within the viewport of the application.

5. The system of claim 1, wherein monitoring a position of the predetermined portion of the first content item relative to a viewport of the application includes:
   determine a first coordinate value of the predetermined portion of the first content item along a first axis;
   determine a second coordinate value of a first portion of the information resource corresponding to one edge of the viewport; and
   determine a third coordinate value of a second portion of the information resource that corresponds to a second edge of the viewport along the first axis,
   wherein determine that the predetermined portion of the first content item is visible within the viewport of the application includes determining that the first coordinate value lies between the second coordinate value and the third coordinate value.

6. The system of claim 1, wherein the supplemental content scroll script is configured to cause the system to:
   receive a candidate supplemental content recommendation, the candidate supplemental content recommendation including a URL of an information resource in which a candidate supplemental content item is stored; and
   update a virtual queue to include the received candidate supplemental content recommendation.

7. The system of claim 1, wherein identifying a supplemental content item includes identifying a plurality of supplemental content items and wherein the supplemental content scroll script is configured to cause the system to:
   generate a plurality of selectable content objects, each of the plurality of selectable content objects corresponding to a respective candidate supplemental content item and including a respective actionable item; and
   responsive to detecting a selection of one of the plurality of actionable items corresponding to the plurality of supplemental content items, displaying a supplemental content item corresponding to that actionable item.

8. The system of claim 7, wherein the supplemental content item is a first supplemental content item and wherein the supplemental content scroll script is configured to cause the system to:
   identify that the first supplemental content item is displayed within the viewport of the application; and
   responsive to identifying that the first supplemental content item is displayed within the viewport of the application, append a second supplemental content item in a third contained at a second position between the second container and the end of the information resource.

9. A system for displaying content items on an information resource, comprising:
   at least one processor; and
   a memory storing computer executable instructions and a supplemental content scroll script, the computer executable instructions when executed on the one or more processors cause the system to:
   transmit a supplemental content scroll script to a computing device to display supplemental content responsive to scroll activity performed on the application, the supplemental content scroll script including a supplemental content identification module, viewport monitoring module and supplemental content appending module, which when executed by a processor of the computing device, cause the computing device to:
identify a supplemental content item to append to a Document Object Model (DOM) tree of the information resource;
identify a first content item displayed within a first container of the information resource;
monitor a position of the first content item relative to a viewport of the application;
determine, responsive to monitoring the position of the predetermined portion of the first content item, that the predetermined portion of the first content item is visible within the viewport of the application;
append, responsive to determining that the predetermined portion of the first content item is visible within the viewport of the application, the supplemental content item in a second container at a first position between the first container and an end of the information resource; and
responsive to detecting a scroll action towards the end of the information resource, display the supplemental content item within the viewport of the application.

10. The system of claim 9, wherein the information resource includes a first information resource and wherein the supplemental content identification module is configured to cause the computing device to select the supplemental content item from a plurality of supplemental content items existing in second information resources of the content publisher.

11. The system of claim 9, wherein the supplemental content appending module is configured to cause the computing device to:
generate the second container to insert to the end of the information resource;
insert, within the second container, the supplemental content item; and
modify one or more setting parameters of the second container to match one or more setting parameters of the second container that includes the first content item.

12. The system of claim 9, wherein the information resource is a first information resource, and wherein the viewport monitoring module is configured to cause the computing device to:
identify that the supplemental content item is displayed within the viewport of the application; and
modify a universal resource locator (URL) included in an address bar of the application from a first URL of the first information resource to a second URL of a second information resource corresponding to the supplemental content responsive to identifying that the supplemental content item is displayed within the viewport of the application.

13. The system of claim 9, wherein monitoring a position of the first content item relative to a viewport of the application includes:
determining a first coordinate value of the predetermined portion of the first content item along a first axis;
determining a second coordinate value of a first portion of the information resource corresponding to one edge of the viewport; and
determining a third coordinate value of a second portion of the information resource that corresponds to a second edge of the viewport along the first axis,
wherein determining that the predetermined portion of the first content item is visible within the viewport of the application includes determining that the first coordinate value lies between the second coordinate value and the third coordinate value.

14. The system of claim 9, wherein the supplemental content identification module is configured to cause the computing device to:
receive a candidate supplemental content recommendation, the candidate supplemental content recommendation including a URL of an information resource in which a candidate supplemental content item is stored; and
update a virtual queue to include the received candidate supplemental content recommendation.

15. The system of claim 9, wherein identifying a supplemental content item includes identifying a plurality of supplemental content items and wherein the supplemental content appending module is configured to cause the computing device to:
generate a plurality of selectable content objects, each of the plurality of selectable content objects corresponding to a respective candidate supplemental content item and including a respective actionable item; and
responsive to detecting a selection of one of the plurality of actionable items corresponding to the plurality of supplemental content items, displaying a supplemental content item corresponding to that actionable item.

16. The system of claim 9, wherein the supplemental content item is a first supplemental content item and wherein the viewport monitoring module is configured to cause the computing device to:
identify that the first supplemental content item is displayed within the viewport of the application; and
responsive to identifying that the first supplemental content item is displayed within the viewport of the application, append a second supplemental content item at a second position between the first supplemental content item and the end of the information resource.

17. A method of displaying content items on an information resource responsive to scroll activity, comprising:
transmitting, by a data processing system, a supplemental content scroll script to display supplemental content responsive to scroll activity performed on the application, the supplemental content scroll script including computer-executable instructions, which when executed by a processor of the client device, cause the client device to:
identify a supplemental content item to append to a Document Object Model (DOM) tree of the information resource;
identify a first content item displayed in a first container of the information resource;
monitor a position of a predetermined portion of the first content item relative to a viewport of the application;
determine, responsive to monitoring the position of the predetermined portion of the first content item, that the predetermined portion of the first content item is visible within the viewport of the application;
append, responsive to determining that the predetermined portion of the first content item is visible within the viewport of the application, the supplemental content item in a second container at a first position between the first container and an end of the information resource; and responsive to detecting a scroll action towards the end of the information resource, display the supplemental content item within the viewport of the application.

18. The method of claim 17, wherein the supplemental content scroll script includes computer-executable instructions, which when executed by the processor of the client device, cause the client device to:

generate the second container to insert to the end of the information resource;

insert the supplemental content item within the second container; and modify one or more setting parameters of the second container to match one or more setting parameters of the first container that includes the first content item.

19. The method of claim 17, wherein the information resource is a first information resource, and wherein the supplemental content scroll script includes computer-executable instructions, which when executed by the processor of the client device, cause the client device to:

identify that the supplemental content item is displayed within the viewport of the application; and modify a universal resource locator (URL) included in an address bar of the application from a first URL of the first information resource to a second URL of a second information resource corresponding to the supplemental content responsive to identifying that the supplemental content item is displayed within the viewport of the application.

20. The method of claim 17, wherein the supplemental content item is a first supplemental content item and wherein the supplemental content scroll script includes computer-executable instructions, which when executed by the processor of the client device, causes the client device to:

identify that the first supplemental content item is displayed within the viewport of the application; and responsive to identifying that the first supplemental content item is displayed within the viewport of the application, append a second supplemental content item in a third container at a second position between the container and the end of the information resource.

* * * * *